United States Patent [19]

Seaborne et al.

[11] Patent Number: 4,806,718
[45] Date of Patent: Feb. 21, 1989

[54] CERAMIC GELS WITH SALT FOR MICROWAVE HEATING SUSCEPTOR

[75] Inventors: Jonathan Seaborne, Concoran; James R. Borek, Burnsville, both of Minn.

[73] Assignee: General Mills, Inc., Minneapolis, Minn.

[21] Appl. No.: 172,098

[22] Filed: Mar. 23, 1988

Related U.S. Application Data

[63] Continuation-in-part of Ser. No. 110,247, Oct. 19, 1987, and Ser. No. 94,972, Sep. 10, 1987, which is a continuation-in-part of Ser. No. 66,376, Jun. 25, 1987, said Ser. No. 110,247, is a continuation-in-part of Ser. No. 56,201, Jun. 1, 1987.

[51] Int. Cl.4 ............................................. H05B 6/80
[52] U.S. Cl. ...................... 219/10.55 E; 219/10.55 F; 426/113; 426/243; 426/107; 99/DIG. 14; 206/591
[58] Field of Search ............... 219/10.55 E, 10.55 F, 219/10.55 M, 10.55 R; 426/107, 110, 113, 241, 243; 99/451, DIG. 14; 206/591, 593, 594; 501/94

[56] References Cited

U.S. PATENT DOCUMENTS

| | | | |
|---|---|---|---|
| 2,582,174 | 1/1952 | Spencer | 219/10.55 F |
| 2,830,162 | 4/1958 | Copson et al. | 219/10.55 F |
| 3,585,258 | 6/1971 | Levinson . | |
| 3,591,751 | 7/1971 | Goltsos | 219/10.55 |
| 3,705,054 | 12/1972 | Matsushita et al. . | |
| 3,783,220 | 1/1974 | Tanizaki | 219/10.55 F |
| 3,853,612 | 10/1974 | Spanoudis | 117/212 |
| 3,857,009 | 12/1974 | MacMaster et al. | 219/10.55 F |
| 3,922,452 | 11/1975 | Forker, Jr. et al. | 219/10.55 |
| 3,946,187 | 3/1976 | MacMaster et al. | 219/10.55 E |
| 3,946,188 | 3/1976 | Derby | 219/10.55 E |
| 4,003,840 | 1/1977 | Ishino et al. | 219/10.55 D |
| 4,190,757 | 2/1980 | Turpin et al. | 219/10.55 E |
| 4,219,361 | 8/1980 | Sutton et al. | 106/63 |
| 4,230,924 | 10/1980 | Brastad et al. | 219/10.55 E |
| 4,266,108 | 5/1981 | Anderson et al. | 219/10.55 E |
| 4,267,420 | 5/1981 | Brastad | 219/10.55 E |
| 4,283,427 | 8/1981 | Winters et al. | 426/107 |
| 4,341,872 | 7/1982 | MacDowell | 501/6 |
| 4,590,349 | 5/1986 | Brown et al. | 219/10.55 E |
| 4,592,914 | 6/1986 | Kuchenbecker | 426/107 |
| 4,594,492 | 6/1986 | Maroszek | 219/10.55 E |
| 4,661,299 | 4/1987 | Thorsrud | 246/25 |

OTHER PUBLICATIONS

"Controlled Microwave Heating and Melting of Gels" by Roy et al., J. Am. Ceram. Soc 68(7) 392–95 (1985).
"Microwave Heating of Neptheline Glass Ceramics" by J. MacDowell, Ceramic Bulletin, vol. 63, No. 2 (1984).

Primary Examiner—A. D. Pellinen
Assistant Examiner—Leon K. Fuller
Attorney, Agent, or Firm—John A. O'Toole

[57] ABSTRACT

Disclosed are ceramic oxide gels (sometimes also referred to as hydrated oxides), and especially xerogels, compositions which are useful in the formulation and fabrication of microwave susceptors for disposable packages for the microwave heating of food items. The compositions include novel microwave absorbing ceramic gel material doped with common salt and a binder. The gel forming materials include alumina, silica, mullite and mixtures thereof. The compositions essentially comprise about 17% to 35% bound water. Preferred materials are xerogels, i.e., ceramic gels dried so as to have a free moisture content of about 0.1% to 10%. The compositions provide good heat generation and a predeterminable upper temperature limit. The materials are common and inexpensive. The compositions can additionally include common salt as a temperature profile moderator.

20 Claims, 6 Drawing Sheets

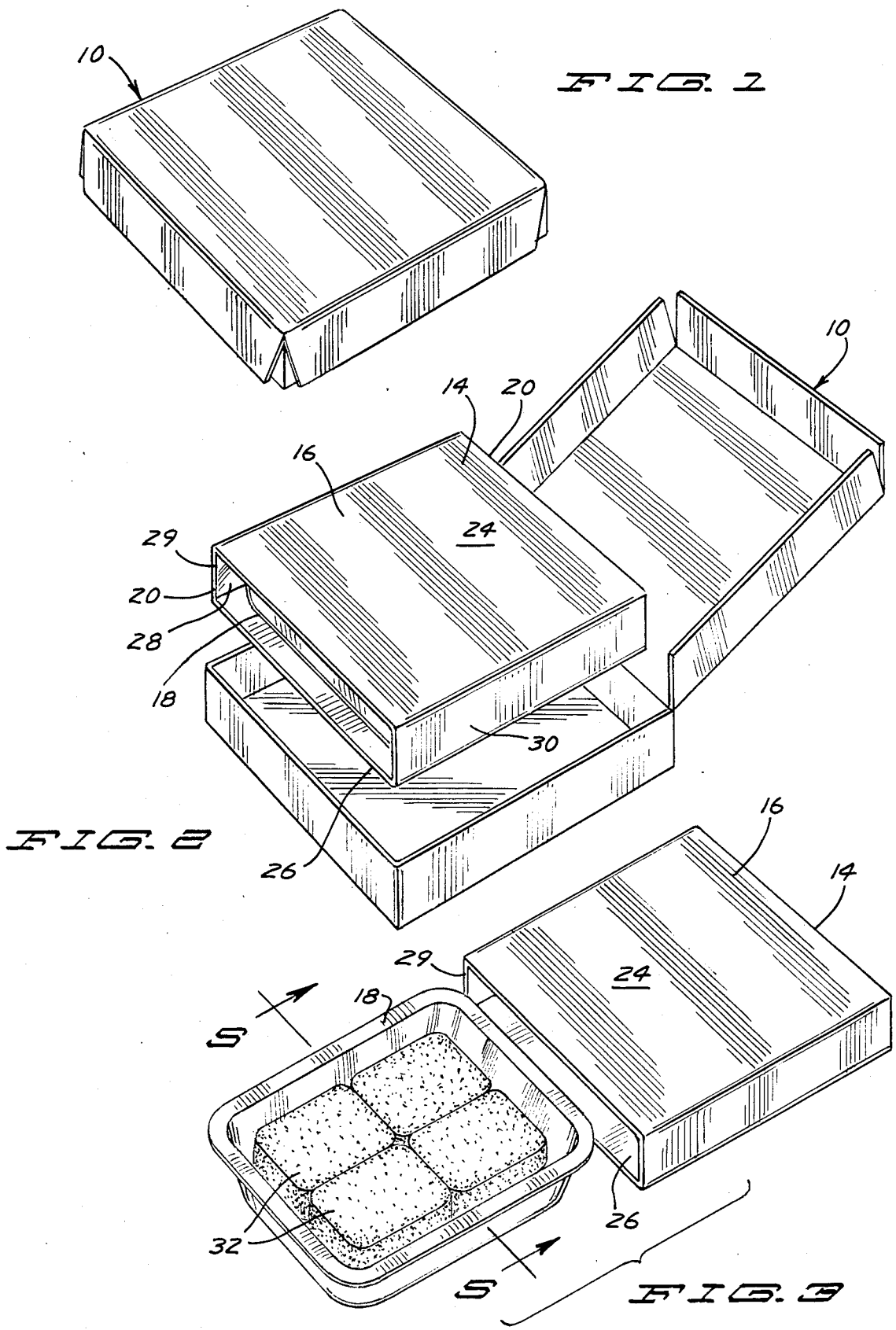

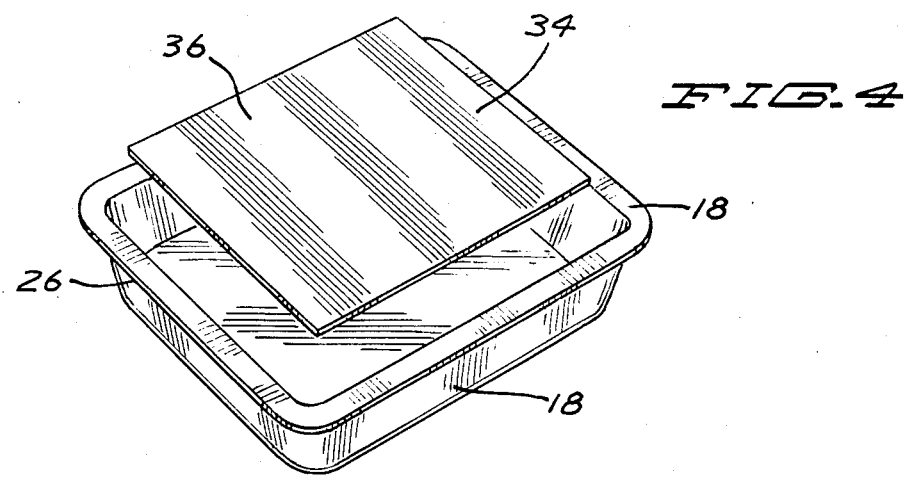
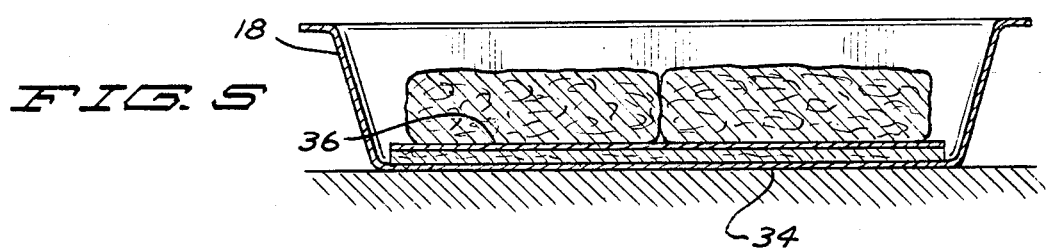
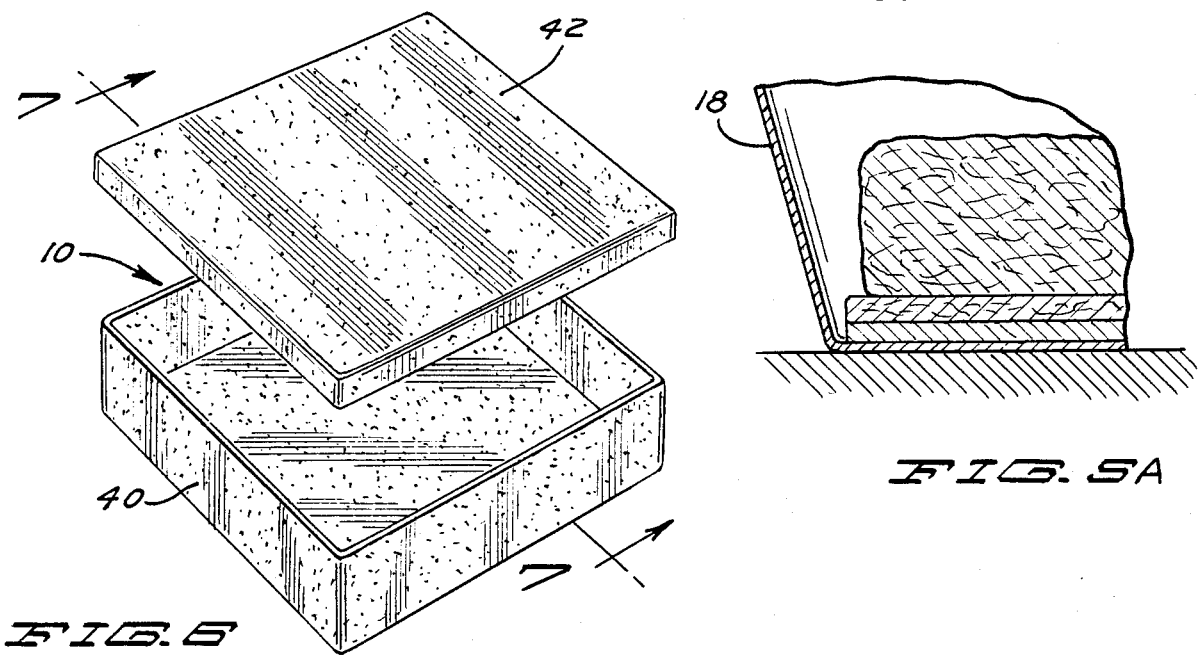
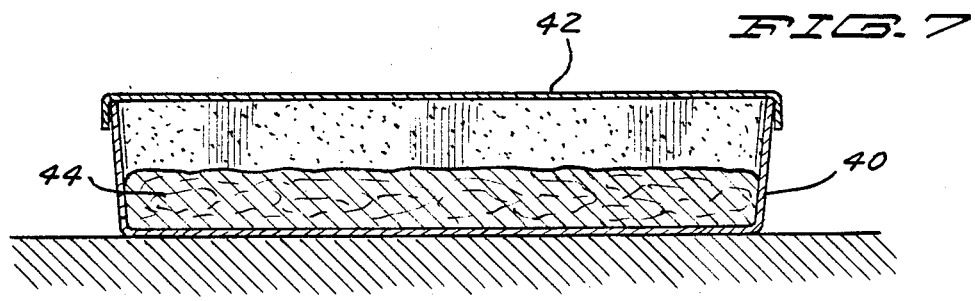

— 5A  · 5B  ○ 5C

CERAMIC GELS WITH SALT FOR MICROWAVE HEATING SUSCEPTOR

CROSS REFERENCE TO RELATED APPLICATIONS

This application is a continuation in part application to U.S. Ser. No. 110,247, filed Oct. 19, 1987, entitled SOLID STATE CERAMIC MICROWAVE HEATING SUSCEPTOR COMPOSITIONS WITH METAL SALT MODERATORS by Seaborne (which in turn is a continuation in part of U.S. Ser. No. 056,201, filed June 1, 1987, entitled SOLID STATE CERAMIC MICROWAVE HEATING SUSCEPTOR COMPOSITIONS by Seaborne), to U.S. Ser. No. 094,972, filed Sept. 10, 1987, entitled AMPHOTERIC CERAMIC MICROWAVE HEATING SUSCEPTOR COMPOSITIONS WITH METAL SALT MODERATORS by Seaborne (which in turn is a continuation in part application of U.S. Ser. No. 066,376, filed June 25, 1987, entitled AMPHOTERIC CERAMIC MICROWAVE HEATING SUSCEPTOR COMPOSITIONS by Seaborne).

BACKGROUND OF THE INVENTION

1. The Technical Field

This invention relates generally to the art of the microwave heating by high frequency electromagnetic radiation or microwave energy. More particularly, the present invention relates to ceramic oxide gel, and/or xerogel containing compositions useful for fabrication into microwave heating susceptors, to microwave heating susceptors fabricated therefrom, suitable for disposable microwave packages for food products, to the microwave packages and to microwave packaged food products.

2. Background Art

The heating of food articles with microwave energy by consumers has now become commonplace. Such microwave heating provides the advantages of speed and convenience. However, heating certain food items, e.g., breaded fish portions, with microwaves often gives them a soggy texture and fails to impart the desirable browning flavor and/or crispness of conventionally oven heated products due in part to retention of oil and moisture. Unfortunately, if microwave heating is continued in an attempt to obtain a crisp exterior, the interior is generally overheated or overdone.

The prior art includes many attempts to overcome such disadvantages while attempting to retain the advantages of microwave heating. That is, the prior art includes attempts at providing browning or searing means in addition to microwave heating. Basically, three approaches exist whether employing permanent dishes or disposable packages to providing microwave heating elements which provide such browning or searing means. Such elements are referred to herein and sometimes in the art as microwave heating susceptors. In the art, materials which are microwave absorptive are referred to as "lossy" while materials which are not are referred to as "non-lossy" or, equivalently, merely "transparent."

The first approach is to include an electrically resistive film usually quite thin, e.g., 0.00001 to 0.00002 cm., applied to the surface of a non-conductor or non-lossy substrate. In the case of a permanent dish, the container is frequently microwave transparent ceramic while for a disposable package the substrate can be a polyester film. Heat is produced because of the $I^2R$ or resistive loss (see for example, U.S. Pat. Nos. 3,853,612, 3,705,054, 3,922,452 and 3,783,220). Examples of disposable packaging materials include metallized films such as described in U.S. Pat. Nos. 4,594,492, 4,592,914, 4,590,349, 4,267,420 and 4,230,924.

A second category of microwave absorbing materials comprise electric conductors such as parallel rods, cups or strips which function to produce an intense fringing electric field pattern that causes surface heating in an adjacent food. Examples include U.S. Pat. Nos. 2,540,036, 3,271,552, 3,591,751, 3,857,009, 3,946,187 and 3,946,188. Such an approach is only taken with reusable utensils or dishes.

A third approach is to form articles from a mass or bed of particles that become hot in bulk when exposed to microwave energy. The microwave absorbing substance can be composed of ferrites, carbon particles, etc. Examples of such compositions or articles prepared therefrom include, for example, U.S. Pat. Nos. 2,582,174, 2,830,162 and 4,190,757. These materials can readily experience runaway heating and immediately go to temperatures in excess of 1200° F. Some control over final heating temperature is obtained by lowering of Curie point by addition of dopants or selected binders.

A review of the prior art, especially that art directed towards provision of heating susceptors for disposable packages for microwave heating of foods, indicates at least four basic problems exist in the formulation and fabrication of heating susceptors. One difficulty with the third category of materials, generally, is that they can exhibit runaway heating, that is, upon further microwave heating their temperature continues to increase. Great care must be taken in fabrication of safe articles containing such materials. Metallized film materials of the first category can be formulated and fabricated such that they do not exhibit runaway heating. However, such films suffer from the second problem; namely, that while their operating temperatures are quite hot, are at controlled temperature, and are sufficient to brown the surface of nearby food items, are due to their thinness and little mass only small quantities of heat are actually generated. Such materials are thus unsuitable for certain foods which require absorption of great amounts of heat or "deep heating" in their preparation, e.g., cake batters. The third general problem is one of cost. Microwave susceptors frequently comprise costly materials. Also, fabrication of susceptor structures frequently is complex and expensive.

Accordingly, in view of the above-noted problems with present microwave susceptors, an object of the present invention is to provide a device which will heat under the influence of the microwave radiation up to an upper temperature limit at which temperatures the devices come to an equilibrium and cease substantially to absorb additional microwave energy and heating to a higher temperature is precluded.

Another object of the present invention is to provide heating materials for and devices fabricated therefrom which are disposable and adapted for use with pre-prepared foods.

A still further object of the present invention is to provide heating materials for and devices fabricated therefrom which can be utilized as a non-disposable utensil.

A still further object of the present invention is to provide heating materials for and devices fabricated therefrom which by appropriate selection of manufacturing and material parameters can provide a predetermined upper temperature limit.

Another object of the present invention is to provide heating materials for and devices fabricated therefrom which are inexpensive to manufacture, safe to use and well adapted for their intended use.

Surprisingly, the above objectives can be realized and new compositions provided which overcome the problems associated with previous materials which have been used for the fabrication of microwave heating susceptors. The present compositions do not exhibit runaway heating yet generate relatively large amounts of heat. Indeed, the final heating temperature can be controlled quite closely. Also, the present compositions are comprised of materials which are commonly available and inexpensive. In the most surprising aspect of the present invention, the compositions comprise ceramic materials previously considered to be microwave transparent or used in microwave transparent ceramic compositions.

BRIEF DESCRIPTION OF THE DRAWINGS

FIG. 1 is a perspective view of a packaged food article for microwave heating constructed in accordance with the teachings of the invention;

FIG. 2 is a perspective view of the packaged food article with outer paperboard outerwrap opened and with an inner tray and sleeve shown disengaged;

FIG. 3 is a perspective view of the tray disengaged from the sleeve and holding several food pieces;

FIG. 4 is a perspective view of the tray with the food items removed showing a microwave heating susceptor raised above its resting position in the tray;

FIG. 5 is a cross sectional view of the tray taken in the direction of lines 5—5 of FIG. 3;

FIG. 6 is a perspective view of an alternate tray with a lid each fabricated from the present compositions with food items removed;

FIG. 7 is a perspective view of the alternate tray taken in the direction of lines 7—7 of FIG. 6.

SUMMARY OF THE INVENTION

Figure 8:
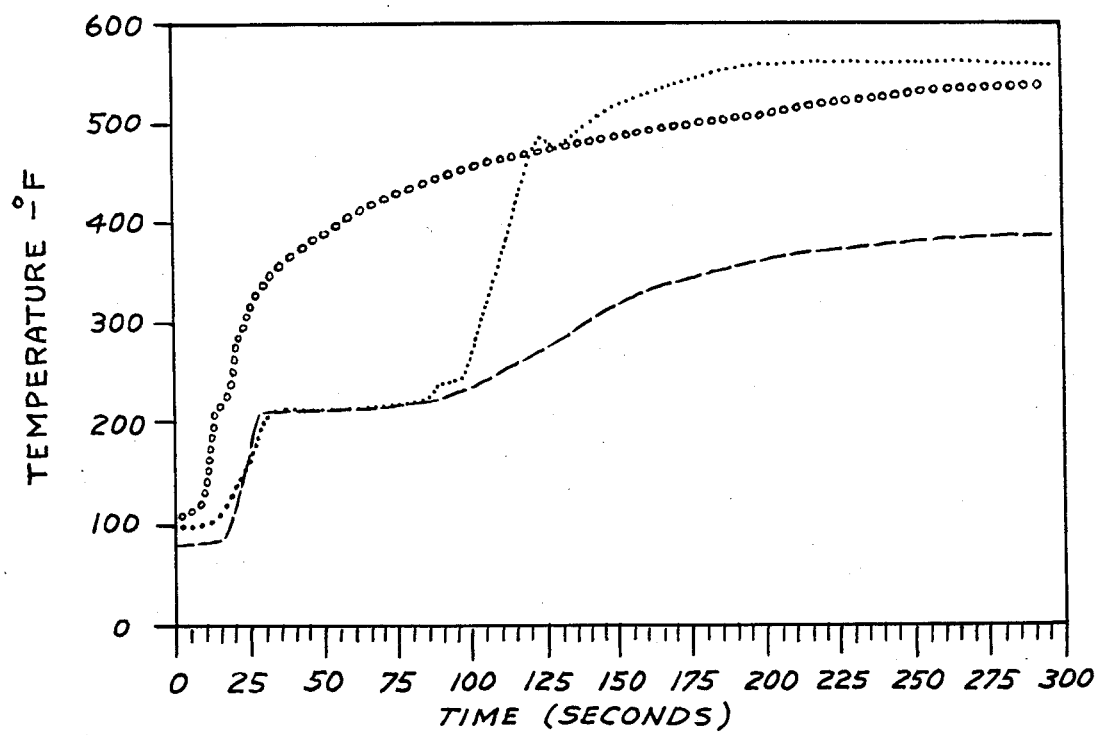
FIGS. 8-15 depict time/temperature response curves for ceramic compositions exemplified in Examples 1-11.

The present invention provides microwave susceptor ceramic oxide gel (or hydrated oxide) and xerogel containing compositions useful in the formulation and fabrication of microwave heating susceptors, especially for disposable packages for the microwave heating of food products.

The present compositions essentially comprise: (1) a ceramic oxide gel or ceramic xerogel as active microwave absorbing or heating materials, (2) a binder, (3) common salt and optionally, (4) an additional absorbing mineral heating material(s).

The present first, microwave absorbing or heating materials are common ceramic materials and are essentially characterized as being gels (a two phase colloidal system consisting of a solid and a liquid) which includes the subcategory of xerogels (gels which have dried until apparently solid and contain low levels 0.1% to 10% of unbound or free moisture) of simple oxide or mixed oxide ceramics. The microwave absorbing materials can comprise about 2% to 99.9% of the ceramic compositions.

The present ceramic compositions additionally essentially comprise about 0.01% to about 12% of sodium chloride.

The binders essentially comprise about 0.1% to 98% of the compositions. Conventional binder materials are suitable for use herein.

In preferred embodiments, the ceramic oxide gel F and/or xerogel materials are used in combination with a second class of microwave absorbing materials, namely amphoteric native minerals that are further essentially characterized by having a residual lattice charge, best defined as having a cation/anion exchange capacity (CEC) or more broadly an ion exchange capacity.

In one of its article aspects, the present invention resides in microwave susceptor devices fabricated from the present compositions. Such devices include microwave heating susceptors preferably in sheet form and which range in thickness from about 0.3 to 8 mm. In another preferred embodiment, the heating susceptor is in the form of a tray. The susceptors find particular usefulness in, and the present invention resides further in, disposable packages for the microwave heating of food and to microwave packaged food items prepared therewith.

In its method aspect, the invention resides in novel heating methods involving the step of subjecting the present compositions to a microwave/electromagnetic field while in contact with an item or object to be heated.

Throughout the specification and claims, percentages are by weight and temperatures in degrees Fahrenheit, unless otherwise indicated.

DETAILED DESCRIPTION OF THE INVENTION

The present invention relates to compositions comprising ceramic oxide gels and ceramic xerogels useful for fabrication into heating susceptors for disposable packages for the microwave heating of food products. The compositions essentially comprise a defined microwave absorbing gel or xerogel material, salt and a binder. Preferred compositions additionally comprise certain additional microwave absorbing heating minerals. In its article aspect, the present invention provides new and improved microwave heat susceptors for packaged food items, to packages for such items and to the packaged food items themselves. In its method aspect, the invention resides in novel heating methods involving the step of subjecting the present compositions to a microwave/electromagnetic field while in contact with an item or object to be heated. Each of the composition ingredients and susceptor elements are described in detail below.

1. Ceramic Gel Microwave Absorbing Material

In the ceramic industry, a distinction is made between "greenware," a ceramic composition before firing or vitrification, and finished, fired or vitrified ceramic compositions. The firing step profoundly changes a large number of the ceramic composition's properties as the individual constituents are fused into a homogeneous mass. Broadly speaking, the present invention is directed toward compositions which would be considered greenware in the ceramic arts.

Certain of the present microwave active materials have been used in greenware ceramic compositions, but generally at markedly different concentrations and for different purposes other than in the present invention. For example, ceramic gels are amorphorous materials with no definite crystal formation and as such are not normally used until in a fused or crystalline state which changes them to an ordered oxide structure (with no shrinkage properties) and which tends to make the gel materials non-microwave active. Ceramic compositions containing minor amounts, e.g., 1% to 2%, of vermiculite are known. However, since vermiculite can expand or even explode during firing, ceramic compositions with high vermiculite levels of the present invention are not known. Micas (phlogophite, biotite, glauconite, muscovite, etc.) are not generally added to ceramics in large concentrations since fired ceramics with mica undesirably exhibit weakness. Likewise, bentonites are also found in clay bodies but at levels less than 2%, otherwise at higher concentrations adverse effects such as extended drying, increased plasticity, and increased settling times are encountered.

The microwave absorbing materials useful herein surprisingly include a wide variety of ceramic materials previously regarded as microwave transparent or used in ceramic compositions transparent to microwaves. By ceramic materials are meant substantially non-ferrous materials comprising oxygen attached to non-carbonaceous elements, and primarily to magnesium, calcium, iron, aluminum, silicon and mixtures thereof although the materials may include incidental iron along with other trace materials and elements. The present auxiliary ceramic materials are further essentially characterized by a residual lattice charge or, synonomously for purposes herein, as having a positive cation exchange capacity for the secondary absorbing mineral accelerators, and gels or xerogels for the simple oxide or mixed oxide ceramic active microwave absorbing materials.

Exemplary ceramic gel useful as microwave absorbing materials herein include all ceramic gel forming materials including alumina gels (alumina monohydrate, Boehmite or psuedoboehmite), silica gels, titania, chromia gels, thoria gels, mullite gels, hydrated oxide gels and mixtures thereof. Preferred gels are selected from the group consisting of alumina, silica, mullite, titania and mixtures thereof. Most preferred for use herein are alumina gels due in part to their low cost and general availability.

Gel formation with acids is well known, e.g., for alumina. Generally, upon addition of an acidic solution, a three dimensional network of both physically and chemically bound water with the metal oxide in each sheet layer is produced. This hydrogel or water swollen network is amorphorous or at most a poorly crystallized alumina. Its low degree of crystallinity is reflected in its broad x-ray diffraction lines. This property is common to all gel ceramics or xerogels. The present ceramic materials are formed into a gel by admixture with diluted acids in a known manner. Useful acids include both selected mineral and selected organic acids, Lewis acids and mixtures thereof. Preferred useful mineral acids are selected from the group consisting of hydrochloric, nitric, phosphoric, boric, sulfuric, perchloric, hydrobromic, hydroiodic and mixtures thereof. Preferred useful organic acids include citric, acetic, lactic, monochloroacetic, hydroxyacetic, oxalic, and mixtures thereof. Most preferred for use herein are the stronger acids, especially mineral acids since gel formation occurs rapidly. The preferred mineral acid of choice is hydrochloric acid.

Generally, up to a point, the stronger the acid or its strength, the stronger the gel formed, but modest addition of salt (sodium chloride) to a weak acid or weak gel system will surprisingly increase the gellation properties of the system. Also, the final microwave heating operating temperature is generally directly related to acid strength and amount for a fixed amount of alumina monohydrate starting material.

In addition to the acidic gels described above, alkaline (or equivalently herein "slaked") gels can also be used.

Strong bases, e.g., NaOH, sodium carbonate, sodium bicarbonate should be avoided since the resulting flocculant precipitate tends to form sodium aluminate and not an alumina gel unless great care is taken in the preparation. On the other hand, organic bases(urea, triethanolamine, etc.), Bronsted-Lowry Bases, Lewis bases and inorganic bases such as ammonium hydroxide, etc. tend to produce an alkaline gel, in an analogous manner to the acid gel; a base precipitated flocculant that ultimately leads to a alumina hydrohydroxide complex which is similar in microwave activity to the acidic prepared sol-gel system.

The skilled artisan will appreciate that a wide variety of materials are known which can be referred to generally as silica gels, not all of which are useful herein. Silica gels performance and utility herein are highly dependent upon their treatment, particularly as it affects their moisture content. Great care must be taken in terminology to distinguish between original free water and/or, i.e., bound water and later absorbed moisture. For example, typically, dried silica gel has been prepared by high temperature drying to remove substantially all free and bound water. Such material is often used as a desiccant and may contain 1% to 5% moisture or more due to absorption of humidity, i.e., surface water. Such a material, however, is not intended for use herein. The ceramic hydrosols, (with salt as later further described) as first formed are embraced by the present usage of the term "ceramic gel." The ceramic hydrosols are operable as ceramic microwave absorbers but due to their gel-like properties are difficult to use in mass produced consumer products. When the ceramic hydrosols are dried, initially free water is removed to produce a xerogel. If, however, drying is continued, all the free water can be removed but the xerogel may still have associated chemically bound water. Such xerogels, still within the general term "ceramic gel," are still useful so long as the xerogels have essentially about 17% to 35% bound water. These xerogels generally take longer times to reach final operating temperatures and have shorter periods of heating before exhaustion, especially as the bound water content is reduced. Xerogels dried to moisture contents of bound water of less than about 17% bound water are for all practical considerations too dry to be considered useful herein. Thus, it is essential that the ceramic gels or xerogels in the finished compositions comprise about 17% to 35% bound water. Preferred microwave absorbing materials are dry xerogels, i.e., can be comminuted into a friable material, which nonetheless comprise a modest amount, generally about 0.1% to 10%, of unbound or free water as well as the bound water. The presence of the free water provides the benefit of reaching final operating temperatures more quickly in the microwave oven.

In one aspect, the present invention provides an improvement over the inventions described in the commonly assigned applications U.S. Ser. No. 110,247, filed Oct. 19, 1987 entitled SOLID STATE CERAMIC MICROWAVE HEATING SUSCEPTOR COMPOSITIONS WITH METAL SALT MODERATORS and U.S. Ser. No. 094,972, filed Sept. 10, 1987 entitled AMPHOTERIC CERAMIC MICROWAVE HEATING SUSCEPTOR COMPOSITIONS WITH METAL SALT MODERATORS. In the present invention, it has been surprisingly discovered that still another class of ceramic materials can be used as the microwave absorbing material in microwave susceptor compositions in full or partial substitution for those ceramic materials disclosed in the applications referenced immediately above.

2. Salt

The present ceramic compositions additionally essentially comprise added common salt or sodium chloride as a temperature profile accelerator. The temperature profile accelerator assists in reaching more quickly the final operating temperature of the ceramic composition. Also, the salt increases substantially the final equilibrium temperature of the ceramic composition.

The preferred ceramic compositions comprise from about 0.01% to about 12% salt by weight to volume of acidulant. More preferably, the common salt comprises about 0.1% to 10% by volume and most preferably about 1% to 8%. While ceramic compositions can be formulated having higher amounts of salt, no advantage is derived therefrom. It is also believed important that the salt exists in an ionized form in order to be functional. Thus, ceramic compositions beneficially containing salt should contain some moisture at some point in the composition preparation.

Generally in the preparation of dried silica gels or xerogels, the hydrogel is mechanically broken up and is washed free of excess salt and then appropriately dried to give an amorphorous granular product. In the present invention however, it is important that salt be added and be in an ionic form and as a part of gel formation in order to be most effective. While not wishing to be bound by the proposed theory, it is speculated herein that the sodium ions are trapped in the gel matrix with the sodium ions located in the diffusing plane of the B-alumina gel. Conveniently, the salt is first dissolved in the acid or base prior to the acid/salt or base/salt solutions addition to the alumina monohydrate from which the gel is formed. Thus, it is important herein to avoid the common step of washing the hydrosol of salt.

Again, while not wishing to be bound by the proposed theory, it is speculated herein that of the ceramic oxide gels or ceramic xerogels as previously discussed, B-alumina is one of a small class of ionic solids which possess large ionic conductivity. The conductivity is associated with a metal ion which is free to diffuse in special planes in directions normal to the C-axis once stimulated or initiated with electromagnetic energy (estimated minimum required energy is on the order of 100–250 joules/moles of susceptor material with the standard consumer microwave oven having more than sufficient energy output to provide the necessary activation energy) and which liberates reasonable amounts of infrared (sensible) heat when allowed to decay to its ground state. The mechanism(s) believed to be responsible for this phenomena are; ion hopping in rigid potential wells with possible associated relaxation of neighbors of the hopping ion; the diffusing ions possess a liquid like behavior and move throughout the lattice pathways freely and are not limited to hopping from one site to another; the ions are merely held in a specific site and rattle when activated lie a ball in a cage.

3. Ceramic Binder

Another essential component of the present ceramic compositions is a conventional ceramic binder, i.e., effective to bind ceramic materials as opposed to a requirement that binders be ceramic in nature. The function of the binder is to form the microwave absorbing material(s) into a solid form or mass. Such ceramic binders are well known in the ceramic art and the skilled artisan will have no problem selecting suitable binder materials for use herein. Exemplary useful materials include both binders which are ceramic and plastic in nature, including, for example, cement, plaster of Paris, i.e., calcium sulphate, silica fiber, silica flour, selected micas, (non-microwave active) selected talcs, colloidal silica, lignin sulphonate, Kevlar ®, ethyl silicate, fibrous calcined Kaolin, calcium carbonate, dolomite, feldspar, pyrophyllite, nepheline, flint flour, mullite, selected clays, silicone, epoxy, crystallized polyester, polyimide, polyethersulfones, wood pulp, oat fiber, peanut hulls, rice hulls, cocoa fiber, coconut fiber, cotton fibers, polyester fibers and mixtures thereof. The binder can comprise from about 0.1% to 98% by weight of the present ceramic compounds, preferably from about 1% to 80%, and for best results about 1% to 60%. Additional exemplary, conventional plastic based binders, both thermoplastic and thermosetting, are described in U.S. Pat. No. 4,003,840 (issued Jan. 19, 1977 to Ishino et al.) which is incorporated herein by reference.

In one preferred embodiment, the present compositions include binders which are organic thermoplastic or thermosetting resins especially those approved as food packaging material such as polyvinyl chloride, polyethylene, polyamides, perfluorocarbon resins, polyphenylene sulfones, polysulfones, polyetherimides, polyesters, polycarbonates, polyimides, epoxies, etc. In these embodiments, the thermoplastic resin binders can range from as little as 5% up to 60% of the composition and preferably about 15% to 50%. Such compositions are especially well suited for fabrication into shaped microwave susceptors, especially food trays, e.g., for TV dinners or entrees.

In certain preferred embodiments, the ceramic compositions additionally essentially include reinforcing fibers or fabric reinforcing. The fibers provide additional strength and resistance from crumbling and breakage. Suitable fibers (natural or synthetic) (whether plate-like or rods) are characterized by possessing high aspect ratios (the ratio of the fibers width to its length), especially those having aspect ratios greater than about 5:1 and in the case of fabric reinforcing are either nonwoven, woven or of the cord variety. The fibers or fabric reinforcing essentially comprise from about 0.5% to 20%, preferably about 1.0% to 10% of the ceramic compositions.

The present compositions include an effective amount of the above described microwave absorbing materials. The precise level will depend on a variety of factors including end use application, desired final temperature, and thickness of the susceptor to be fabricated from the present compositions. Good results are generally obtained when the microwave absorbing material comprises from about 2.0% to about 99.9% by weight of the present ceramic compositions (dry basis). Preferred compounds include from about 20% to 99% by weight of the microwave absorbing material. For best results, the ceramic compositions comprise about 40% to 99% by weight of the microwave absorbing materials.

4. Second Microwave Absorbing Material

In certain preferred embodiments, the compositions additionally include a second ceramic microwave absorbing material. These second selected microwave absorbing materials and their other general physical and chemical properties are well known and described generally, for example, in "An Introduction to the Rock Forming Materials," by Deer, Howie and Zussman, Longman Group Limited, Essex, England., 1966. Materials are as therein described generally classified as ortho and ring silicates, chain silicates, sheet silicates, framework silicates and nonsilicates. The second microwave absorbing materials useful herein can fall into any of these classifications although not all materials in those classifications are useful herein. Those materials which are useful as additional absorbing or heating mineral accelerators are those as described above having a positive cation exchange capacity. The materials are further characterized by relatively low electrical resistivity, i.e., about 0.1 to 35 ohm.cm and are thus classifiable as semiconductors in the broad sense of the term. It is speculated herein that these materials have heretofore been unappreciated as being useful as consumer microwave absorbing materials since most investigations of their electromagnetic absorption/transparency has been done at very different frequencies if at all. These materials, their properties and use in microwave susceptors are described in U.S. Ser. No. 066,376 entitled AMPHOTERIC CERAMIC MICROWAVE HEATING SUSCEPTOR COMPOSITIONS (filed June 25, 1987 by J. Seaborne) and which is incorporated herein by reference.

Exemplary specific materials include:

Vermiculite, $(Mg,Ca)_{0.7}$ $(Mg,Fe^{+3},Al)_{6.0}$ $[(Al,Si)_8O_{20}]$ $(OH_4) \cdot 8H_2O$ including both native and exfoliated (i.e., having been subjected to roasting heat of 1200° F. whereby the vermiculite is expanded by the loss of bound water);

Glauconite, $(K, Na, Ca)_{1.2\text{-}2.0}$ $(Fe^{+3}, Al, Fe^{+2}, Mg)_{4.0}$ $[Si_{7\text{-}7.6}Al_{1\text{-}0.4}O_{20}](OH)_4 \cdot n(H_2O)$;

Bentonites, $(\frac{1}{2} Ca,Na)_{0.7}(Al,Mg,Fe)_4$ $[(Si,Al)_8O_{20}](OH_4) \cdot nH_2O$;

Montmorillonoids or smectites, $(\frac{1}{2} Ca,Na)_{0.7}$ $(Al,Mg,Fe)_4[(Si,Al)_8O_{20}](OH)_4 \cdot nH_2O$;

phlogopite mica, $K_2(Mg,Fe^{+2})_6[Si_6Al_2O_{20}](OH,F)_4$;

Biotite mica, $K_2(Mg,Fe^{+2})_{6\text{-}4}(Fe^{+3},Al,Ti)_{0\text{-}2}$ $[Si_{6\text{-}5}Al_{2\text{-}3}O_{20}](OH,F)_4$;

Zeolite, whether natural or synthetic: general formula, $M_xD_y[Al_{x+2y}Si_{n\text{-}(x+2y)}O_{2n}] \cdot mH_2O$ where
M=Na,Ka, or other monovalent cations
D=Mg,Ca,Sr,Ba, and other divalent cations;

Hectorites, $(\frac{1}{2} Ca, Na)_{0.66}$ $(Si_8Mg_{5.34}Li_{0.66}O_{20})$ $(OH)_n \cdot nH_2O$;

Chlorites, $(Mg, Al, Fe)_{12}[(Si,Al)_8O_{20}](OH)_{16}$;

Illites, $K_{1\text{-}1.5}Al_4$ $[Si_{7\text{-}6.5}Al_{1\text{-}1.5}O_{20}](OH)_4$;

Attapulgites;

Saponite $(\frac{1}{2} Ca, Na)_{0.66}$ $[Si_{7.34}Al_{0.6}O_{20}](OH)_n \cdot nH_2O$;

Sepiolite;

Ferruginous smectite $(\frac{1}{2} Ca, Na)_{0.66}$ $(Al,Mg,Fe)_4$ $[(Si,Al)_8O_{20}](OH)_4 \cdot nH_2O$;

Kaolinites; and

Halloysite.

Other materials with residual lattice charges or cationic exchange capacity, e.g., mixed layer clays and the like and mixtures thereof can also be used. Preferred F materials include vermiculite, bentonite, hectorite, saponite, smectites, glauconites, micas and illite and mixtures thereof due to the relatively flat and/or uniformity of their final heating temperature. The particle size of the first or second microwave absorption material(s) or "refractory" is not critical. However, finely ground refractory materials (i.e., having an average particle size of less than 200 microns) are preferred inasmuch as the ceramic susceptors produced therefrom are smooth and uniform in texture.

Useful concentrations of the second ceramic microwave absorbing material range from about 0.1% by weight to 50%, preferably about 5% to 30% of the ceramic compositions.

Method of Fabrication

The present ceramic compositions can be fabricated into useful microwave absorbing articles by common ceramic fabrication techniques by a simple admixture of the materials into a homogeneous blend, and for those binders requiring water, e.g., cement or calcium sulphate, addition of sufficient amounts of water to hydrate the binder. Typically, water will be added in a weight ratio to composition ranging from about 1:1 to 4:1. While the wet mixture is still soft, the ceramic compositions can be fabricated into desirable shapes, sizes and thicknesses and thereafter allowed to harden. The materials may be dried at accelerated rates without regard to drying temperatures and can be dried with air temperatures even in excess of 180° F. (82° C.) but less than fusion or firing temperatures (<1000° F.) and preferably below 400° F. although care is to be given to the extent of drying as described above.

Another common fabrication technique is referred to as compression molding. In compression molding a damp mix, e.g., 3% to 10% moisture of water, activated binders dried after initial gel preparation, are employed, or a dry mix if not, is placed into a mold and subjected to compression to effect a densification of the composition to form a firm body. Still another useful fabrication technique is isostatic pressing which is similar to compression molding but with one side of the mold being flexible. Isostatic pressing is especially useful in forming curved ceramic pieces. These latter fabrication techniques would preferably use the xerogel ceramic microwave absorbing material.

When plastic binders are employed, it has been found that shearing adversely affects microwave temperature performance. Outgassing during compounding (admixing the refractionary and plastic binder resin) also has been observed which, unfortunately, negatively affects performance. Thus, during fabrication, it is desirable to minimize shear or excessive compounding.

In addition to density and the other factors described herein, the final heating temperature of the present compositions is also mildly influenced by the thickness of the susceptor elements fabricated. Good results are obtained when susceptor thickness ranges from about 0.3 to 8 mm in thickness, both when using the present improved compositions and when using the previously described ceramic compositions without the temperature profile moderators. Preferred susceptors have thicknesses ranging from 0.7 to 4 mm. All manner of shapes and size heating susceptors can be fabricated although thin flat tiles are preferred in some applications.

The present ceramic compositions are useful in any number of microwave absorption applications. The present ceramic compositions are particularly useful for fabrication into microwave susceptors which in turn are useful as components in packages for foods to be heated with microwaves.

Still another advantage of the present invention is that susceptors fabricated from the present ceramic compositions provide a microwave field modulating effect, i.e., evening out peaks and nodes, i.e., standing wave points and, it is believed independent of wattage. This benefit is especially useful when sensitive foods such as cookie doughs or protein systems are being microwave heated.

Still another advantage of the present ceramic compositions is that they are believed to be useful not only with microwave ovens operating at 2450 MHz but at all microwave frequencies, i.e., above as low as 300 MHz.

Another advantage is that the ceramic susceptor can be coated with plastics or inorganic coatings to render the surface non-absorptive to moisture and oil as well as providing a non-stick surface. Surface coated susceptors find utility not only as an element in microwave food packages, but also when the susceptor compositions are fabricated into medical devices such as for the microwave thermal treatment of cancer. Also; colorants, both organic and inorganic in nature may be incorporated at appropriate levels into either the coating or body of the ceramic susceptor to aid in aesthetics without adversely affecting the performance of the ceramic susceptor.

The skilled artisan will also appreciate that the present compositions absorb microwave radiation at a wide range of frequencies and not merely at those licensed frequencies for consumer microwave ovens.

Of course, one advantage of the present invention is that upon heating in a conventional microwave oven, e.g., 2450 MHz, the ceramic compositions will relatively quickly (e.g., within 30 to 300 seconds) heat to a final temperature ranging from about 300° to 800° F. which temperature range is very desirable in providing crisping, browning to foods adjacent thereto and consistent with safe operation of the microwave oven. Another advantage is that the heating temperature profile with respect to time is relatively flat once an equilibrium state is obtained.

In addition to use in the disposable packages described herein, the susceptor compounds of the present invention can also be utilized in non-disposable utensils adapted for repetitive heating cycles by embedding the heater or otherwise associating the heater with a non-disposable utensil body. The susceptor is associated with the remainder of the utensil in a manner such that the heater will be in heat transfer relation to a product to be heated in or on the utensil. The utensil can be in the form of an open top dish, griddle or the like. However, the present compositions will exhaust their ability to heat upon microwave exposure relatively quickly, i.e., after only a few cycles of operation.

Still another advantage of the present ceramic susceptor compositions is that they can be fabricated into heating elements which can absorb oil. Such a feature is particularly useful when used to package and to microwave heat food items which are par-fried. A further unexpected advantage is that such oil absorption has minimal adverse effect on heating performance in terms of final heating temperatures reached or heat generation.

It is important that the susceptors fabricated herein be unvitrified, i.e., not subjected to a conventional firing operation generally above 800° F. to 1000° F. (426° C. to 538° C.). Conventional firing can result in a fused ceramic composition substantially transparent to microwave and thus devoid of the desirable microwave reactive properties of the present invention.

Referring now to the drawings. For example, FIG. 1 illustrates generally a packaged food item 10 fabricated in accordance with the teachings of the present invention and suitable for microwave heating. FIG. 2 shows that the article 10 can optionally comprise a six-sided outerwrap 12 which can be plastic, e.g., shrink wrap, paper or other conventional packaging material such as the paperboard package depicted. The article can further comprise an inner assembly 14 disposed within the outerwrap 12 which can comprise a sleeve 16 fabricated from a dielectric material and disposed therein a tray 18. In conventional use, the consumer will open the article 10, remove and discard the overwrap 12, and insert the entire assembly into the microwave oven. The sleeve 16 is helpful although not essential not only to prevent splattering in the microwave oven, but also to assist in securing the food items against excessive movement during distribution.

In FIG. 2, it can be seen that the sleeve 16 can comprise an opposed pair of open ends, 20 and 22, an upper major surface or top wall 24, a lower major surface or bottom wall 26 and an opposed pair of minor side or wall surfaces 28 and 30. As can be seen in FIG. 3, the tray 18 holds or contains one or more food items 32. FIG. 4 shows the tray 18 with the food items 32 removed. Disposed within the tray 18 is one or more microwave heating susceptors such as microwave susceptor heating panel 34. In this preferred embodiment, the susceptors are generally flat or plaar and range in thickness from 0.020 to 0.250 inch.

Still referring to FIGS. 3 and 4, with the cooking of certain foods, it may be desirable to heat the food items 32 from only or primarily one side by use of the heating susceptor panel 34 while at the same time minimizing the heating of food item 32 by exposing it to microwave radiation through the walls of the package assembly 14. To allow microwave radiation to reach the susceptor 34, the bottom wall 26 is microwave transparent at least to the extent that sufficient microwave energy can enter the package to heat the susceptor 34. Side walls 28 and 30 can each optionally be shielded with shielding 29 as can top wall 24 thereby restricting the entry of microwave radiation through these walls to the food product as is known in the art. The shielding 29 can be of any suitable type material of which aluminum foil is a currently preferred material. With the use of shielding, the microwave radiation penetrates the microwave transparent bottom 26 only. Accordingly, cooking of the food product 32 in this embodiment is accomplished substantially totally by the heat transferred to the food product 32 from the susceptor 34 although some microwave entry through the open ends 20 and 22 occurs. It is pointed out that the terms microwave transparent and microwave shield are relative terms as used herein and in the appended claims.

In FIG. 5, it can be seen that the heating panel 34 can optionally comprise a thin finish layer 36, e.g., 0.00005 to 0.001 inch (0.001 to 0.025 mm) to impart desirable surface properties, e.g., color, water repellency, smooth appearance, stick free, etc. In the simplest form, such a layer can comprise ordinary paraffin or a sodium silicate polymerized with zinc oxide or a high temperature polyetherimide film. The finish layer does not substantially adversely affect the performance of the microwave susceptor. Such surface property modification finds particular usefulness when the microwave susceptors are used in medical settings. For example, it is known to fabricate surgical implants, e.g., discs, cylinders, from ferrites which absorb microwave radiation to thermally treat tumors. In such applications wherein the present compositions are employed, water repellency may be particularly desirable.

Other types of packages can be utilized with the ceramic microwave heater compositions of the present invention. It is an important advantage that the present compositions can be fabricated into susceptors of different configurations whether regular, e.g., corrugated, or irregular.

Another embodiment is depicted in FIG. 6. Plastic resins are preferred for use as the binder materials. In this embodiment, the article 10 in addition to outerwrap 12 as shown in FIG. 2 can comprise a microwave heating susceptor 40 fabricated into trays or shallow pans whether square, rectangular, circular, oval, etc. which serve both to contain and heat the food items. Such tray shaped susceptors 40 find particular suitability for use in connection with a batter type food item 44, especially cake batters or with casseroles, baked beans, scalloped potatoes, etc. In one particular embodiment the tray 40 can additionally include a cover 42 also fabricated from the present ceramic compositions. Trays 40 with covers 42 are especially useful for batter food items like brownies in which it is desired to form an upper or top skin to the food item 44.

In still another embodiment shown in FIG. 5A, the panel susceptor 34 can additionally comprise a backing layer(s), especially a metal foil, e.g., aluminum 46. The foil serves to reflect back to the susceptor 34 microwave energy passing through the susceptor 34. The incorporation of a microwave shielding or reflecting layer 29 in close proximity on the opposite surface of the ceramic susceptor 34 also serves to act as a susceptor temperature booster to elevate the operating temperature substantially above the temperature obtained without a microwave shielding or reflective layer 29. The final temperature reached can be as high as 100° F. or more over similar structures without the metal foil. Also, the use of the temperature booster can reduce the need for a thicker ceramic susceptor to obtain the same temperature thereby reducing both production costs as well as final weights of the microwave package. Since the ceramic compositions adhere to the metal foil with some difficulty, and cause an in heating interference due to conductor-wave phenomena interaction, it is preferable to treat the surface of the metal foil with an intermediate or primer layer (not shown) for better adherency, i.e., ordinary primer paints, or to have an intermediate silicone layer, or to select those binders for the ceramic compositions with increased capacity to adhere to metal foils.

Without further elaboration, it is believed that one skilled in the art can, using the preceding description utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food, ceramic and packaging arts, can be undertaken without departing from the spirit and scope of this invention.

EXAMPLE 1

For comparison and establishment of baseline microwave heating performance of a salt free ceramic gel, 50 g of alumina monohydrate (Boehmite) AlO.(OH) (molecular weight 59.987) supplied from Remet Chemical Corporation, Chadwick, N.Y./Condea Chemie GMBH, Zentralverkauf, Hamburg, Germany were dispersed with stirring in 125 ml of a 0.36 M HCl solution. A clear-semitransparent paste-like gel immediately formed and was allowed to equilibrate for several hours. The alumina gel was spread into a 4 inch square, 0.125 inch thick on glassine paper. The gel was subjected to a 750 watt, 2450 MHz microwave field for a period of five minutes while the temperature of the gel surface was monitored using a Luxtron 750 ® Fluoroptic temperature monitor available from Luxtron, Mountain View, CA equipped with ceramic clad fiber optic temperature probes and interfaced with an IBM PC/AT TM personal computer for data collection and handling. The recorded and averaged (three, simultaneous probe points, no data deleted) temperature profile of the gel is shown in FIG. 8 as line 1.

The above outlined procedure was repeated using various strength HCl acid solutions. The results are tabulated below in Table 1 with selected data points reported for the time-temperature relationships during the microwave heating.

TABLE 1

| Acid strength<br>Gel properties<br>Heating time | 0.12 M<br>weak<br>°F. | 0.25<br>firm<br>°F. | 0.30<br>firm<br>°F. | 0.48<br>very firm<br>°F. | 0.36<br>firm<br>°F. |
|---|---|---|---|---|---|
| 0 sec. | 75 | 75 | 75 | 75 | 75 |
| 30 | 220 | 220 | 220 | 220 | 220 |
| 60 | 220 | 225 | 225 | 225 | 220 |
| 90 | 225 | 250 | 280 | 260 | 240 |
| 120 | 230 | 260 | 325 | 310 | 280 |
| 150 | 250 | 300 | 350 | 340 | 330 |
| 180 | 312 | 330 | 375 | 355 | 360 |
| 210 | 360 | 375 | 385 | 360 | 390 |
| 240 | 380 | 400 | 400 | 370 | 400 |
| 270 | 415 | 418 | 410 | 375 | 410 |
| 300 | 425 | 425 | 410 | 375 | 425 |

EXAMPLE 2

50 g of alumina monohydrate (Boehmite) AlO.(OH) (M.W. 59.987) were dispersed with vigorous stirring in 125 ml of a 0.36 M HCl solution containing 7.59 of NaCl M.W. 58.44 (6% NaCl based on weight to volume). A clear semitransparent gel immediately formed and was allowed to equilibrate for several hours. The prepared modified (i.e., salt doped) gel was spread into a four inch square, 0.125 inch thick on glassine paper. The gel was subsequently heated as outlined in Example 1. The recorded and averaged temperature profile of the gel is shown in FIG. 8 as line The above outlined procedure was repeated using several different concentrations of NaCl in the 0.36 M HCl solution to show the effect of salt on the heating rates and temperature profiles of the gel heaters and also the maximum effect obtained by addition of the salt. The results are tabulated below in Table 2 with selected data points reported for the time-temperature relationship during the microwave heating. Similar plots are obtained for other acids and acid concentrations.

TABLE 2

| Salt concentration* | 2 | 6 | 8 | 10 | 4 |

TABLE 2-continued

| weight in grams | 2.5 g | 7.5 | 10.0 | 12.5 | 5.0 |
|---|---|---|---|---|---|
| Heating time (seconds) | °F. | °F. | °F. | °F. | °F. |
| 0 | 70 | 70 | 70 | 70 | 70 |
| 30 | 212 | 212 | 212 | 212 | 212 |
| 60 | 212 | 212 | 212 | 240 | 212 |
| 90 | 212 | 260 | 415 | 425 | 230 |
| 120 | 230 | 475 | 470 | 475 | 415 |
| 150 | 300 | 520 | 500 | 500 | 465 |
| 180 | 400 | 540 | 520 | 515 | 490 |
| 210 | 420 | 555 | 535 | 520 | 500 |
| 240 | 440 | 560 | 545 | 520 | 510 |
| 270 | 450 | 560 | 550 | 525 | 510 |
| 300 | 455 | 560 | 555 | 525 | 510 |

*grams NaCl in 125 ml 0.36 N HCl (% w/v).

Figure 9:
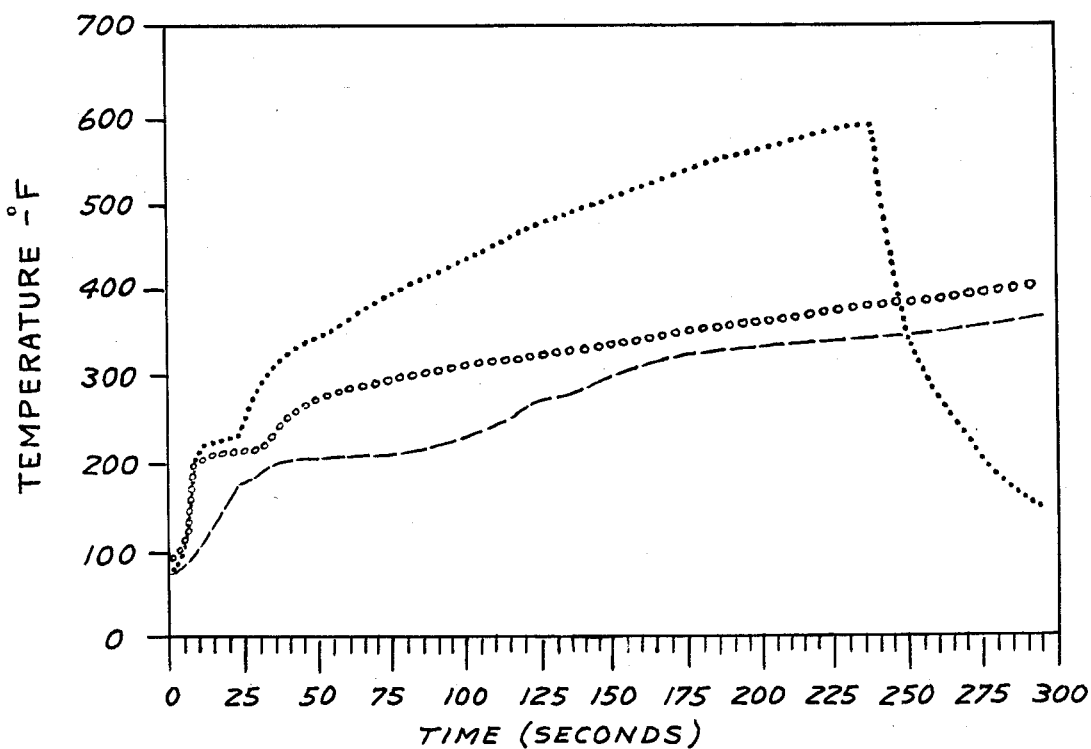

EXAMPLE 60 g of alumina monohydrate (Boehmite) AlO.(OH) (M.W. 59.987) were dispersed with vigorous stirring in 125 ml of a 0.36M HCl solution containing 7.5 g of NaCl M.W. 8.44 (6% NaCl based on weight to volume). A clear semitransparent gel immediately formed and was allowed to equilibrate for several hours. The prepared modified (i.e., salt doped) gel was spread into a 4 inch square, 0.125 inch thick on glassine paper. The gel was subsequently treated as outlined in Example 1. The recorded and averaged temperature profile of the gel is shown in FIG. 9 as line 3.

The above outlined procedure was repeated using several different concentrations of alumina monohydrate in the 0.36M HCl solution to show the effect of alumina monohydrate on the heating rates and temperature profiles of the gel heaters and also the maximum effect obtained by addition of the alumina monohydrate. The results are tabulated below in Table 3 with selected data points reported for the time-temperature relationship during the microwave heating. Similar plots are obtained for other acids and acid concentrations.

TABLE 3

| Boehmite solids* % (w/v) | 32 | 48 | 56 | 68 | 40 |
|---|---|---|---|---|---|
| Weight alumina monohydrate | 40 g | 60 | 70 | 80 | 50 |
| Heating time (seconds) | °F. | °F. | °F. | °F. | °F. |
| 0 | 72 | 77 | 75 | 76 | 70 |
| 30 | 167 | 188 | 185 | 148 | 212 |
| 60 | 211 | 207 | 208 | 199 | 212 |
| 90 | 222 | 219 | 224 | 211 | 260 |
| 120 | 321 | 257 | 261 | 225 | 475 |
| 150 | 373 | 298 | 275 | 257 | 520 |
| 180 | 395 | 327 | 291 | 298 | 540 |
| 210 | 407 | 339 | 315 | 334 | 555 |
| 240 | 415 | 350 | 332 | 353 | 560 |
| 270 | 423 | 361 | 340 | 366 | 560 |
| 300 | 430 | 380 | 348 | 372 | 560 |
| gel properties | soft | firm | very firm | very firm/solid | firm |

*% alumina monohydrate per 125 ml 0.36 N HCl containing 7.5 g NaCl

EXAMPLE 4

50 g of alumina monohydrate (Boehmite) AlO.(OH) (M.W. 59.987) were dispersed with vigorous stirring in 125 ml of a 0.36M HCl solution containing 7.5 g of NaCl M.W. 58.44 (6% NaCl based on weight to volume) and 5.0 g of dispersed bulk Q-Fiber (amorphous silica as a binder) (Manville Corporation, Waterville, Ohio, 43693). A semitransparent gel immediately formed and was allowed to equilibrate for a short time. The prepared gel was spread into a 3.5 inch square 0.125 inch thick and air dried at 120° F. (48.9° C.) overnight (moisture content 4.6%). The dry tile dimensions were 3 inches × 3 inches × 0.11 inches thick, weight 14.8 g—approximately a 35% shrinkage upon drying. The dry gel was subsequently evaluated/tested as outlined in Example 1. The recorded and averaged temperature profile of the dry gel susceptor is shown in FIG. 8 as line 4.

Figure 10:
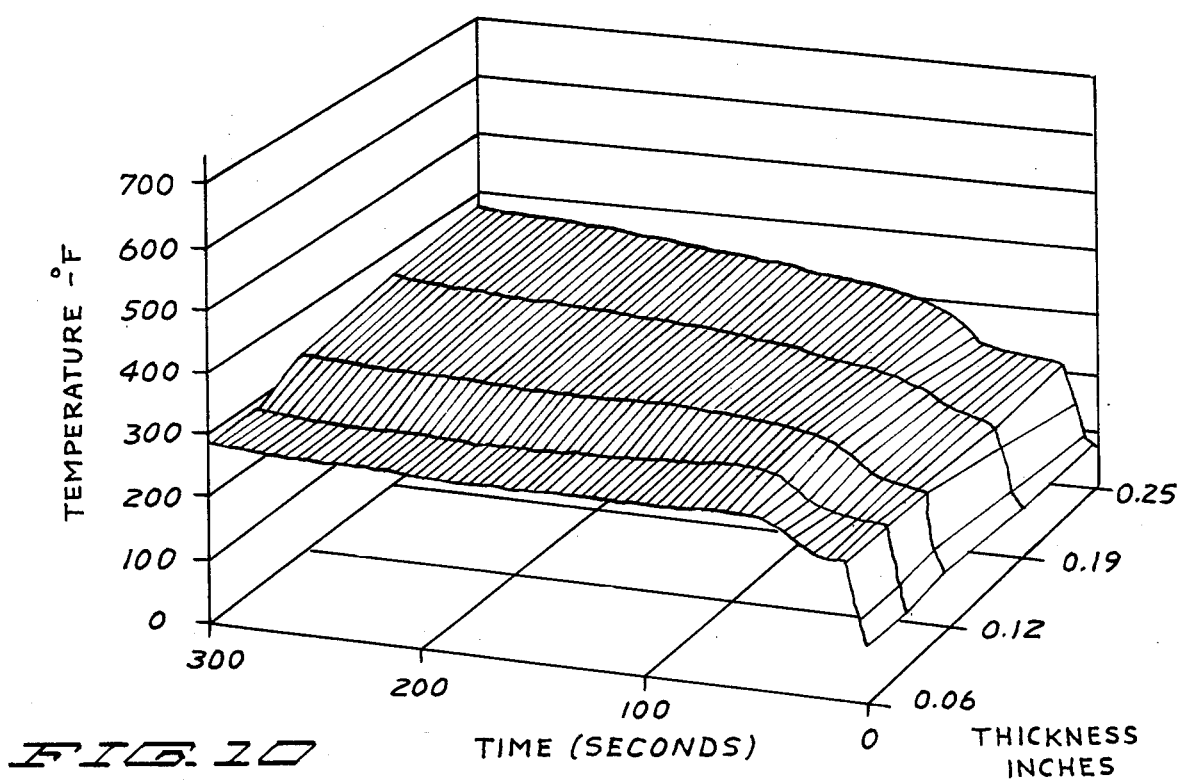

The above procedure was repeated in preparing several heaters of different thicknesses to demonstrate the effect of thickness on heating rates and maximum attainable temperature plateaus. The results are shown graphically in FIG. 10. Similar results are observed for other acid strengths and fiber loading levels.

The above procedure was repeated substituting for the bulk Q-Fiber at the various test levels the following: Tempstran ® Fibers—discrete noncontinuous glass filaments (Johns-Manville, Denver, Colo.); Graphite Fiber—chopped and filament (Hercules Inc., Magna, Utah); Refrasil Bulk Fiber (amorphorus silica) (Hitco Materials Division, Gardena, Calif.); Kevlar ® and Kevlar ® blends (American Filters and Abrasives, Co., Inc., Bangor, Mich.); Cellulosic fiber-paper (Thilmany Pulp & Paper Co., Kaukauna, Wisc.); Nomex ®-high melting aramid fiber filament and staple (E. I. DuPont, Wilmington, Del.); chopped cotton and nonwoven cotton, (Cotton Incorporated, Raleigh, N.C.); Muscovite mica (U.S. Gypsum Co., Chicago, Ill.); silica 400 mesh (Ottawa Silica Company, Ottawa, Ill.).

The results obtained were similar to those previously described both for structural properties and heating performance in the microwave. Structural integrity was maintained with materials that were rod or plate like in nature. Materials that tend to be more spherical (aspect ratios about 1–5) in nature, i.e., silica, sand, etc., tend to produce structures that are broken, checked or severely cracked upon drying and are more difficult to use as binders.

EXAMPLE 5

50 g of alumina monohydrate (Boehmite) AlO.(OH) (M.W. 59.987) were dispersed in 125 ml of various 0.36M acid solutions (mineral and organic). The gel, paste or flocculant precipitate that resulted was allowed to equilibrate for several hours before drying to 3% to 5% moisture in a warm air oven at 135° F. (57.2° C.). The dried and ground material was then evaluated in 25 g portions as a loose powder for microwave heating properties in a 100 ml pyrex beaker as previously detailed.

The above procedure was repeated using acid solutions containing 7.5 g of sodium chloride (M.W. 58.44) in 5 ml of the 0.36 N acidic solutions. The examples indicate the beneficial effect of salt addition as well as the increased heating profiles of the modified dry gel (xerogel) preparations.

Figure 11:
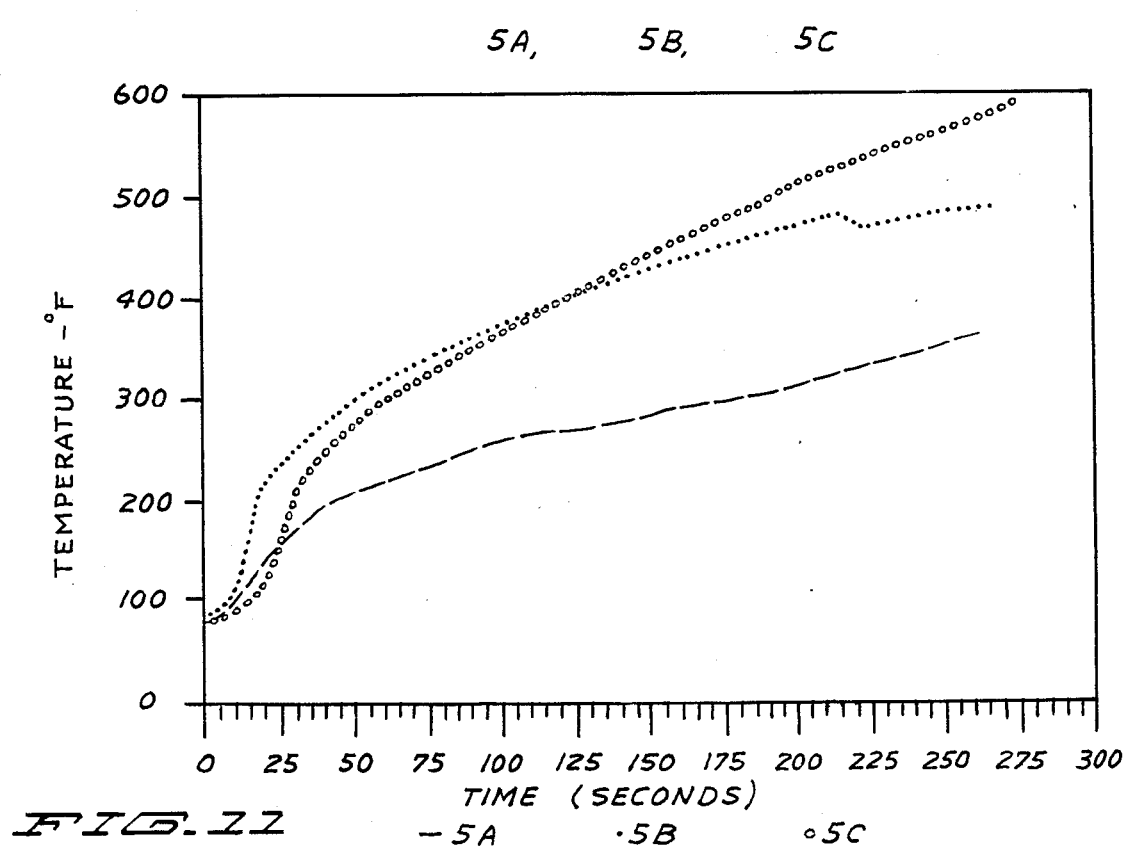

The above procedure was again repeated using acid solutions containing 7.5 g of sodium chloride and 15 g of ground exfoliated vermiculite (Strong-Lite Products, Pine Bluff, Ark.). The results are indicated for selected acidic systems in Table 4. Column A is for acid activated systems, Column B is for the acid plus salt activated systems, Column C is for the acid plus salt/vermiculite systems all in loose powder form. Compression of samples for increased densification results in increased performance in both heating rates and maximum obtained temperatures. A typical heating profile for each system described above is shown in FIG. 11, line 5A for boric acid, FIG. 11, line 5B for boric acid and salt, FIG. 11, line 5C for boric acid, salt and vermiculite. The examples exemplify the beneficial effect of salt addition and vermiculite addition on heating rates and maximum obtained temperatures. Note, temperatures in excess of 800° F. could not be measured due to limited range of temperature probes.

TABLE 4

Maximum Temperature Plateaus Powder Systems

| Acid Treatment | Temperature °F. at Maximum | | | Times at* Temp. Max. |
|---|---|---|---|---|
| | $A^1$ | $B^2$ | $C^3$ | |
| Boric acid | 365 | 488 | 592 | |
| Sulfuric acid | 416 | 599 | 646 | |
| Phosphoric | 390 | 753 | 650 | B, 200 sec. |
| Nitric | 525 | 710 | 801 | C, 265 |
| Acetic | 388 | 460 | 621 | |
| Lactic | 296 | 406 | 513 | |
| Oxalic | 371 | 721 | 495 | B, 245 |
| Citric | 241 | N.A. | 566 | |
| Hydrobromic | 655 | 705 | N.A. | |
| Hydroiodic | 720 | N.A. | N.A. | A, 240 |

*300 seconds unless noted.
[1]acid system;
[2]acid system plus salt;
[3]acid system plus salt/vermiculite.

EXAMPLE 6

50 g of alumina monohydrate (Boehmite) AlO.(OH) (M.W. 59.987) were dispersed in 125 ml of various 0.36M basic solutions (mineral, organic and Lewis Bases). The gel, paste or flocculant precipitate that resulted was allowed to equilibrate for several hours before drying to 3% to 5% moisture in a warm air oven at 135° F. (57.2° C.). The dried and ground material was then evaluated in 25 g portions as a loose powder for microwave heating properties in a 100 ml pyrex beaker as previously detailed.

The above procedure was repeated using basic solutions containing 7.5 g of sodium chloride (M.W. 58.44) in 125 ml of the 0.36N basic solutions. The examples indicate the beneficial effect of salt addition as well as the increased heating profiles of the modified dry gel (xerogel) preparations.

Figure 12:
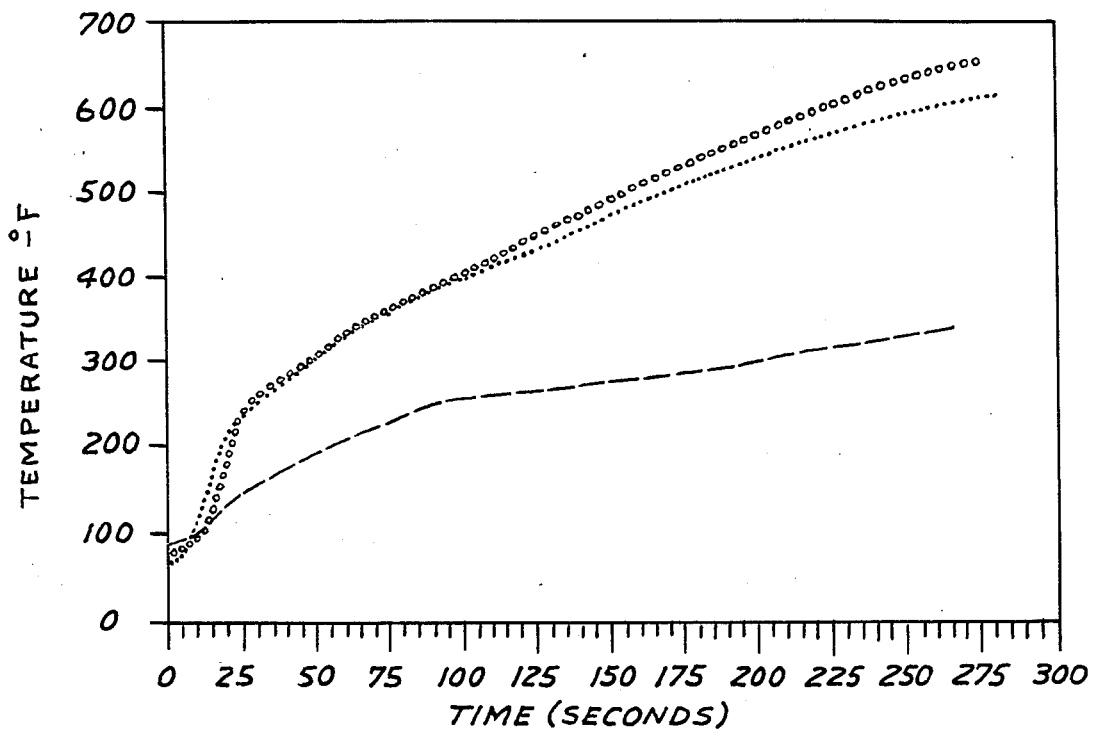

The above procedure was again repeated using basic solutions containing 7.5 g of sodium chloride and 15 g of ground exfoliated vermiculite (Strong-Lite Products, Pine Bluff, Ark.). The results are indicated for selected base systems in Table 5. Column A is for base activated systems, Column B is for the base plus salt activated systems, Column C is for the base plus salt/vermiculite systems all in loose powder form. Compression of samples for increased densification results in increased performance in both heating rates and maximum obtained temperatures. A typical heating profile for each system described above is shown in FIG. 12, line 6A for ammonia hydroxide, FIG. 12, line 6B for ammonia hydroxide and salt, FIG. 12, line 6C for ammonia hydroxide, salt and vermiculite. The examples exemplify the beneficial effect of salt addition and vermiculite addition on heating rates and maximum obtained temperatures. Note, temperatures in excess of 800° F. could not be measured due to limit ranges of temperature probes.

TABLE 5

Maximum Temperature Plateau Powder Systems

| Basic treatment | Temperature °F. at Maximum | | | Time at* Temp. Max. |
|---|---|---|---|---|
| | $A^1$ | $B^2$ | $C^3$ | |
| Ammonia hydroxide | 338 | 608 | 651 | |
| Urea | 353 | 529 | 557 | |
| Triethanolamine | 368 | 509 | 620 | |

*300 seconds unless noted.
[1]base activated;
[2]base plus salt activated;
[3]base plus salt/vermiculite.

EXAMPLE 7

5 g of ground exfoliated vermiculite (Strong-Lite Products Corp., Pine Bluff, Ark. 71611) were dispersed into 125 ml of a 0.36M HCl solution containing 7.5 g of sodium chloride, M.W. 58.44, and 15 g of dispersed Fiber Frax ®, a ceramic refractory fiber (vitreous aluminosilicate fiber) Sohio Carborundum Co., Niagara Falls, N.Y. To the above prepared solution 50 g of alumina monohydrate (Boehmite M.W. 59.987) was added and dispersed with vigorous stirring. A semi-transparent gel immediately formed and was allowed to equilibrate for one hour. The prepared gel was spread to a thickness of 3/32 inch (0.0938 inch, 2.38 mm) over a 3.5 inch square (12.25 inch square area) and dried overnight at 120° F. (48.9° C.) to a final moisture of 3.5%. The dry tile weight was 11.6 g with final dimensions of 2.875 inches×2.875 inches×0.0827 inch. The susceptor was evaluated as outlined in Example 1. The recorded and averaged temperature profile of the dry gel (xerogel) susceptor is shown in FIG. 9 as line 7A.

The above procedure was repeated with the following modifications; 15 g of ground exfoliated vermiculite was substituted for the 5 g of vermiculite and 5 g of Fiber-Frax ® was substituted for the 15 g of Fiber-Frax ®. The dry tile weight was 13.9 g with final dimensions of 3.18 inches×3.18 inches×0.0827 inch. The susceptor was evaluated as outlined in Example 1. The recorded and averaged temperature profile of the dry gel (xerogel) susceptor is shown in FIG. 9 as line 7B.

The above procedure was repeated using the following formulation:

| 50 g | alumina monohydrate (Boehmite) |
| 10 g | ground exfoliated vermiculite |
| 7.5 g | sodium chloride |
| 125 ml | 0.36 M HCl |
| 10 g | Fiber-Frax ® silica fiber |

The prepared gel was made into several plaques 3.5 inches square with thicknesses of 1/16, 3/32, ⅛, 5/32 and ¼ inch (0.0625, 0.0938, 0.125, 0.156, 0.25 inch) (1.58, 2.38, 3.17, 3.97, and 6.35 mm.). Final dry tile weights and dimensions were as follows:

| | Weight | Length | Width | Thickness |
|---|---|---|---|---|
| 1/16 inch cast - | 8.8 g | 3.0 in. | 3.00 in. | 0.050 in. |
| 3/32 inch cast - | 13.7 | 2.87 | 3.00 | 0.070 |
| ⅛ inch cast - | 15.5 | 2.87 | 3.02 | 0.080 |
| 5/32 inch cast - | 21.9 | 3.06 | 3.13 | 0.150 |
| ¼ inch cast - | 27.8 | 2.94 | 3.00 | 0.250 |

Figure 13:
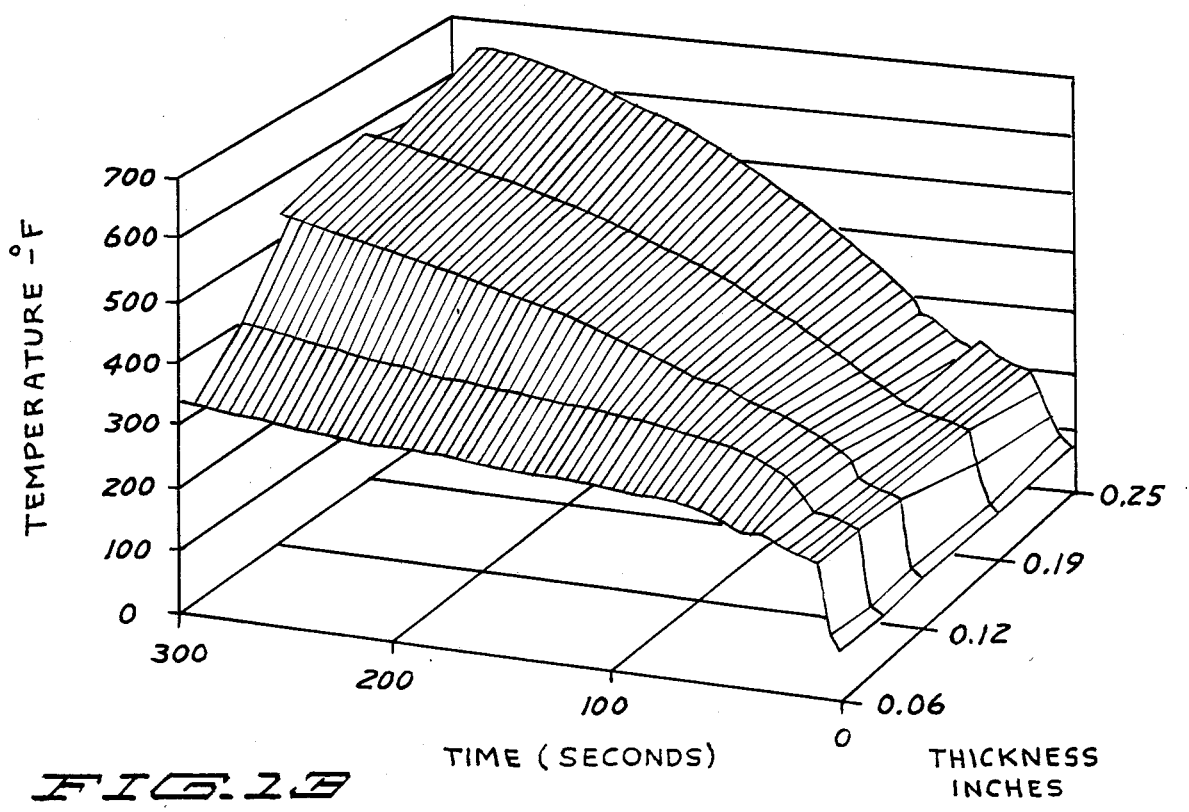

The recorded and averaged temperature profiles of the dry gel (xerogel) susceptors obtained as outlined in Example 1 are shown in FIG. 13 as a surface response curve which originates as a function of time, thickness and temperature during microwave exposure for each tile. It is demonstrated that the amount and presence of the vermiculite does have a surprisingly significant impact on the surface response heating curve of the gel (xerogel) heating structure as can be seen by a comparison of Example 4 data plots and FIG. 10 with the above reported Example 7, FIG. 13 plots.

EXAMPLE 8

Figure 14:
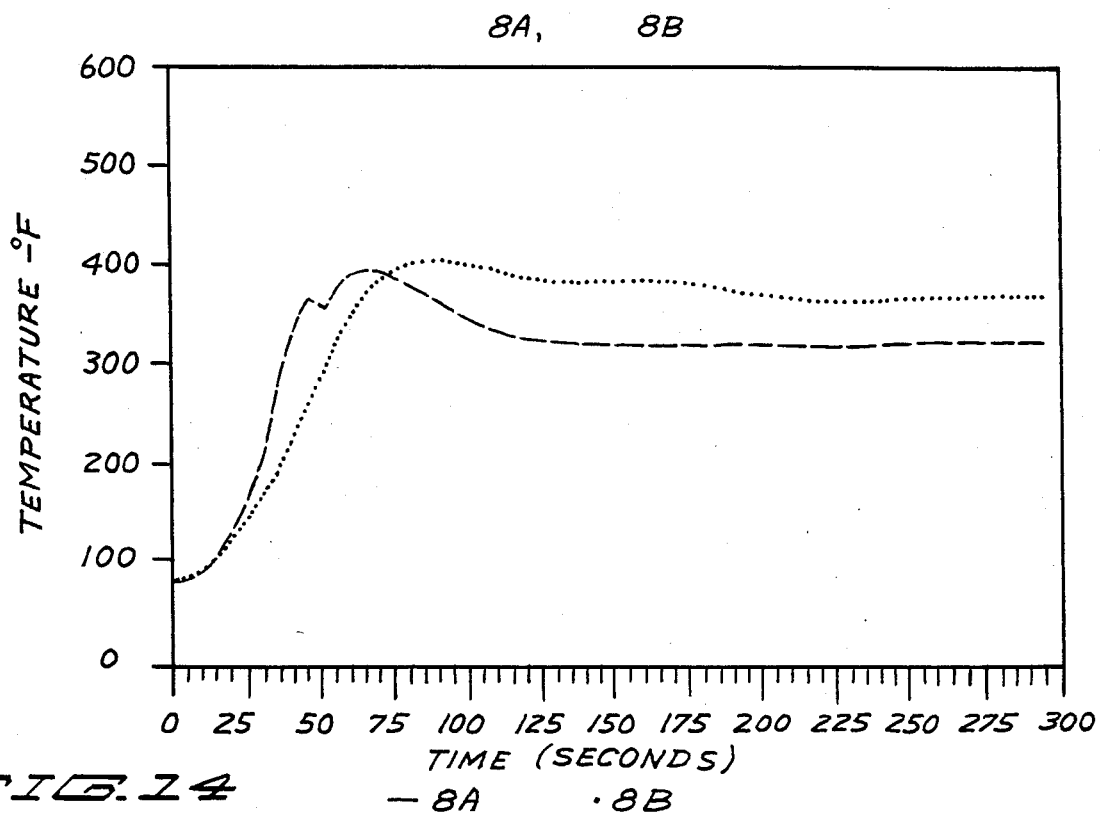

50 g of alumina monohydrate (Boehmite) Al).(OH) (M.W. 59.987) were dispersed with vigorous stirring in 125 ml of a 0.36M HCl solution containing 7.5 g of NaCl M.W. 58.44 (6% NaCl based on weight to volume) and 20 g of muscovite mica-200 P Mica (United States Gypsum Company, Chicago, Ill.). A gel immediately formed and was allowed to equilibrate for one hour. The prepared gel was analytically determined based on moisture vacuum data to have about 17% to 35% bound moisture and 3% to 5% unbound water. The gel was spread into 5.25 inch×7.50 inch×0.055–0.060 inch thick sheets containing a nonwoven fiberglass mat (Elk Corporation, Ennis, Tex.) for internal support and dried for several hours at 140° F. (60° C.). The heating structure exhibited minimal shrinkage, no cracking or warping. Final thickness 0.032–0.035 inch, weight 25.2 g. The structure was measured for heating performance in a microwave field as previously described. The recorded and averaged temperature profile of the heating structure is shown in FIG. 14 as line 8A. Measurements were discontinued due to temperature probe lifting from heating surfaces.

The above procedure was repeated substituting 20 g of a 400 mesh silica flour (Ottawa Silica Company, Ottawa, Ill.) for the muscovite mica to observe the effect of particle shape and size on integrity of the heating structure. Upon drying the susceptor was cracked, and flaking apart indicating poor structural integrity of the heating material when laminated upon the nonwoven fiberglass mat. The results indicate the need for plate like or rod like reinforcement to provide a suitable structural integrity which cannot be provided by spherical or low aspect ratio binders alone even though the heat output and temperature requirements are still met or exceeded as shown in FIG. 14 line 8B.

The former procedure was repeated using several woven and nonwoven internal support structures to observe their effect on the heating susceptor properties and integrity. The materials examined were as follows: UC10028 Refrasil woven cloth, weight 0.216 g/in$^2$, dense woven plain weave warp 52, fill 22, and 6PT23-40 Nor-Fab Cloth, Hitco Material Division, Gardena, Calif.; Nextel 312 Plain weave 0.016" THK, 3M Ceramic Materials Division, Memphis, Tenn.; Manniglass series, Manning Paper Company, Troy, N.Y.; woven fabrics of graphite, Kevlar, glass, quartz and ceramic fibers, Ciba-Geigy Corporation, Fountain Valley, Calif.; nonwovens of polyester and fiberglass/polyester, Fiber Dynamics Inc., New York, N.Y.; woven fiberglass various weaves, thickness and weights; Clark-Schwebel, Fiber Glass Corporation, White Plains, N.Y., cheese cloth—local purchase—woven cotton; Selee/Fe ceramic foam fibers, Consolidated Aluminum Ceramic Division, Bridgeton, Mo.

The results obtained were similar to the results with the nonwoven mat for heating properties. Structural properties improved with the openness of the weave or porosity of the nonwoven or foam. Surface adhesion could be improved by washing or pretreating the support structure to improve wettability and adhesion.

Increased pressure of application as well as fluidity of the gel also improved bonding and penetration into the fabric support. Final preferred structures depend on desired attributes, attributes for flexibility with the above materials ranged from rigid to fairly flexible with all exhibiting adhesion to substrate, nonflaking coatings and similar heating properties and surface textures.

Continuing the substitution using clays, bentonites, talcs, feldspars and similar materials whether swelling or nonswelling produced the same end result as seen with the silica flour—good heating performance but poor surface characteristics indicating that best surface properties—smoothness, defect free, etc.—are best obtained using higher aspect ratio materials as fillers in these systems if one is preparing from a gel coating.

EXAMPLE 9

In order to demonstrate the observed effect of the microwave heating properties on starting material quality, preparation method, purity and composition, several sources and types of alumina monohydrate were prepared.

50 g of alumina monohydrate were dispersed with vigorous stirring in 125 ml of a 0.36N HCl solution containing 7.5 g of NaCl M.W. 58.44. The prepared material was dried overnight at 165° F. (74° C.) and evaluated for microwave heating as previously outlined. The results are tabulated below in Tables 6, 7 and 8 for each of the materials evaluated. The columns in each table are for the following ingredients: Table 6, Column 1, Versal 900, Kaiser Chemicals, Baton Rouge, La.; Table 6, Column 2, Versal 850; Table 6, Column 3, Versal 250, all Versal products are psuedo-bochmite; Table 6, Column 4, Kaiser Activated Alumina A-2; Table 7, Column 1, Standard alumina - Al$_2$O$_3$ - aluminum oxide, activated, acid F.W. 101.96, Alfa Products, Danvers, Mass.; Table 7, Column 2, aluminum oxide activated basic, Alfa Products; Table 7, Column 3, aluminum oxide, activated neutral, Alfa Products; Table 8, Column 1, low dispersible Boehmite Condea Chemie GMBH, Hamburg, Germany; Table 8, Column 2, medium dispersible Boehmite; Table 8, Column 3, low purity Boehmite; Table 8, Column 4, medium purity Boehmite. Boehmite as used in previous examples is high purity, high dispersible form available from Condea Chemie, GMBH, Hamburg, Germany.

Comparison of this data with the previous examples indicate that Boehmite in varying forms of purity and dispersibility still exhibits the same microwave interaction properties. It is also evident that this extends to psuedo-boehmite in its various forms as well as treated activated aluminas prepared either from Boehmite, psuedo-boehmite or calcined alumina, although degree of calcining, preparation method, temperature and particle size of alumina during this process do seem to play an important factor in the amount of microwave activity the calcined modified product will display. Also, with the Boehmite, pore size and crystal size of the starting material is important. Preferred materials exhibit smaller pore size 10–100 Angstroms and smaller crystal size, while less preferred materials exhibit pore sizes above 200 Angstrom radius and large crystal size.

TABLE 6

| Heating time | Column 1 °F. | Column 2 °F. | Column 3 °F. | Column 4 °F. |
|---|---|---|---|---|
| 0 sec. | 72 | 75 | 69 | 74 |
| 30 | 296 | 325 | 301 | 242 |
| 60 | 466 | 552 | 410 | 342 |
| 90 | 542 | 614 | 493 | 401 |
| 120 | 602 | 639 | 545 | 438 |
| 150 | 645 | 669 | 573 | 462 |
| 180 | 685 | 695 | 603 | 479 |
| 210 | 716 | 714 | 629 | 490 |
| 240 | *1 | *2 | 649 | 498 |
| 270 | | | 663 | 503 |
| 300 | | | 670 | 506 |
| gel properties | firm | firm | firm | none-granular |

*1 725° F. at 220 seconds, discontinued run.
*2 722° F. at 225 seconds, discontinued run.

TABLE 7

| Heating time | Column 1 °F. | Column 2 °F. | Column 3 °F. |
|---|---|---|---|
| 0 sec. | 73 | 71 | 72 |
| 30 | 239 | 242 | 258 |
| 60 | 315 | 282 | 318 |
| 90 | 345 | 334 | 348 |
| 120 | 350 | 356 | 366 |
| 150 | 352 | 368 | 375 |
| 180 | 350 | 373 | 378 |
| 210 | 348 | 375 | 377 |
| 240 | 347 | 375 | 376 |
| 270 | 346 | 375 | 373 |
| 300 | 346 | 372 | 373 |
| gel properties | none-granular | none-granular | none-granular |

TABLE 8

| Heating time | Column 1 °F. | Column 2 °F. | Column 3 °F. | Column 4 °F. |
|---|---|---|---|---|
| 0 sec. | 75 | 74 | 71 | 73 |
| 30 | 337 | 299 | 292 | 350 |
| 60 | 406 | 476 | 457 | 463 |
| 90 | 467 | 539 | 542 | 532 |
| 120 | 588 | 582 | 590 | 582 |
| 150 | 687 | 626 | 634 | 622 |
| 180 | *1 | 660 | 671 | 656 |
| 210 | | 693 | 701 | 688 |
| 240 | | 712 | *3 | 713 |
| 270 | | *2 | | *4 |
| 300 | | | | |
| gel properties | firm | firm | firm | firm |

*1 713° F. at 170 sec., discontinued run.
*2 712° F. at 240 sec., discontinued run.
*3 715° F. at 225 sec., discontinued run.
*4 713° F. at 240 sec., discontinued run.

EXAMPLE 10

The stock used in making up the silica based gels were a water-glass solution containing 0.210 g $SiO_2$ per cc. and a 3.75N HCl solution. The water-glass solution was made by diluting the concentrated "N" brand sodium silicate (28.7% $SiO_2$) obtained from Philadelphia Quartz Company (PQ Corporation), Valley Forge, Pa. The water-glass solution was then added to the acid solution with vigorous mechanical stirring. In making the silica-alumina gels and other mixed gel systems, the aluminum salt or other salts were dissolved in the acid solution prior to the mixing. The gels were allowed to equilibrate for 24 hours prior to drying to 3% to 5% free moisture at 100° F. (37.8° C.) in a forced air over for 12 hours. 25 g of the dry gel or xerogel were placed into a 100 cc. pyrex beaker and evaluated for microwave heating as previously detailed. The recorded and averaged temperature profiles of the selected materials are listed in Tables 9 to 12 as described below.

A silica gel was prepared by mixing 250 ml silicate solution (0.210 g $SiO_2$ per cc.) with 250 ml of a 3.75N HCl solution. The gel was translucent and the xerogel was white. The heating profile is listed in Table 9, Column 1. The above mix was repeated after dissolving 7.5 g NaCl moderator in the 250 ml 3.75N HCl solution. The heating profile is listed in Table 9, Column 2.

The silica-alumina (mullite) gels were prepared by mixing 525 ml of (0.210 g $SiO_2$ per cc.) silicate solution with 250 ml of 3.75N HCl containing 90.3 g (0.15 Moles) of aluminum sulfate ($Al_2(SO_4)_3 \cdot 14H_2O$). The gel was white along with the xerogel. The heating profile is listed in Table 9, Column 3. The salt modified mullite gel was prepared as outlined above with the 3.75N HCl solution containing both the aluminum sulfate and 7.5 g of sodium chloride. The heating profile is listed in Table 9, Column 4.

A silica-iron hydrogel was prepared by dissolving 10 g $FeCl_3 \cdot 6H_2O$ (M.W. 270.30) in 125 cc. 3.75N HCl containing 1.0 g NaCl. Addition of 200 ml of the silicate solution (0.210 g $SiO_2$ per cc.) resulted in a pale yellow gel after 24 hours equilibration, initial gel color was dull green/gray. After aging for one week the gel was a pumpkin color. Upon drying to 3% to 5% free moisture a dull orange xerogel resulted. The heating profile is listed in Table 10, Column 1. A similar gel without the salt addition was prepared and the heating profile listed in Table 10, Column 2. Ratio of ingredients were 550 ml (0.210 g $SiO_2$ per cc.) silicate solution, 345 ml 3.75N HCl containing 40 g $FeCl_3 \cdot 6H_2O$. An iron hydroxide or iron hydrogel was prepared mixing 200 ml of a 0.12M $FeCl_3 \cdot 6H_2O$ with 200 ml of a 0.36M NaOH solution. The gelatinous material was washed to remove the excess chloride ion and air dried. The brown xerogel was heated in a microwave and the heating profile listed in Table 10, Column 3. It is very evident that the addition of silica and free salt is synergistic in the gel-xerogel system for the iron-hydrogel.

A chromia gel was prepared by dissolving 70 g of chromium nitrate $Cr(NO_3)_3 \cdot 9H_2O$ (M.W. 400) in 500 ml water. To this was added 500 ml of a 1.8 molar ammonium hydroxide solution. The blue-green gel was dried after filtering and washing. The microwave heating profile is listed in Table 11, Column 1. A second chromia gel was prepared with the ammonia solution containing 10.5 g of sodium chloride. The blue-green gel was filtered, washed, and dried at 100° F. (37.8° C.). The microwave heating profile is listed in Table 11, Column 2. It is evident that the salt addition to the gel system does increase modestly the microwave heating properties of the chromia gel system.

A titania gel was prepared by precipitation/gelation with ammonium hydroxide (250 ml, 6.1M) from an aqueous solution of titanium tetrachloride (1.5M) M.W. 190 (70 g in 250 ml). The precipitate/gel was washed and dried at ambient conditions (21° C., 70° F.) for 48 hours. The microwave heating profile is listed in Table 11, Column 3. A second titania gel containing sodium chloride was prepared as above containing 10.5 g of sodium chloride dissolved in 250 ml of a 1.5M titanium chloride (M.W. 190) solution. The microwave heating profile of the salt enhanced titania gel is listed in Table 11, Column 4.

A thoria gel was prepared by dissolving 50 g of thorium nitrate—(M.W. 552)—$Th(NO_3)_4 \cdot 4H_2O$ in 200 ml of distilled water and adding slowly with stirring 200 ml of a 2.0M ammonium hydroxide solution. A white gel formed immediately, the gel was filtered, washed and air dried for 48 hours at 70° F. (21° C.). The microwave heating profile of a 25 g powdered portion of the thoria gel is listed in Table 12, Column 1. A second thoria gel containing 7.5 g of sodium chloride was prepared. The salt was dissolved prior to gelation in the thorium nitrate solution. The white gel was dried to 5% to 10% moisture by air drying for 48 hours at 70° F. (21° C.). A 25 g portion in powder form was placed into a 50 ml beaker and evaluated for microwave heating properties. The heating profile is listed in Table 12. Column 2.

It is evident that in each case presented above that addition of a modest amount of sodium chloride dramatically alters the heating profile of the gels or xerogels in a microwave environment. This phenomena or interaction could by expected to hold for other similarly prepared metal hydrate oxide gels including hydrated tin, zirconium, manganese, amphoteric metals and other transition elements.

TABLE 9

| Heating time | Column | | | |
|---|---|---|---|---|
| | 1 °F. | 2 °F. | 3 °F. | 4 °F. |
| 0 sec. | 69 | 75 | 73 | 75 |
| 30 | 225 | 234 | 232 | 137 |
| 60 | 241 | 253 | 241 | 223 |
| 90 | 290 | 302 | 253 | 233 |
| 120 | 337 | 336 | 277 | 247 |
| 150 | 371 | 368 | 301 | 312 |
| 180 | 393 | 398 | 320 | 384 |
| 210 | 406 | 424 | 331 | 470 |
| 240 | 413 | 447 | 337 | 566 |
| 270 | 418 | 465 | 340 | 694 |
| 300 | 420 | 480 | 345 | 760 |

TABLE 10

| Heating time | Column | | |
|---|---|---|---|
| | 1 °F. | 2 °F. | 3 °F. |
| 0 sec. | 71 | 75 | 72 |
| 30 | 210 | 239 | 214 |
| 60 | 222 | 259 | 217 |
| 90 | 229 | 302 | 218 |
| 120 | 275 | 340 | 219 |
| 150 | 339 | 365 | 222 |
| 180 | 394 | 381 | 227 |
| 210 | 442 | 392 | 233 |
| 240 | 482 | 399 | 236 |
| 270 | 513 | 402 | 238 |
| 300 | 530 | 406 | 240 |

TABLE 11

| Heating time | Column | | | |
|---|---|---|---|---|
| | 1 °F. | 2 °F. | 3 °F. | 4 °F. |
| 0 sec. | 85 | 71 | 67 | 74 |
| 30 | 114 | 201 | 237 | 278 |
| 60 | 158 | 227 | 314 | 377 |
| 90 | 208 | 236 | 352 | 482 |
| 120 | 219 | 254 | 383 | 585 |
| 150 | 219 | 279 | 449 | 611 |
| 180 | 221 | 298 | 538 | 619 |
| 210 | 228 | 308 | 574 | 619 |
| 240 | 236 | 315 | 570 | 617 |
| 270 | 245 | 321 | 557 | 615 |

TABLE 11-continued

| Heating time | Column | | | |
|---|---|---|---|---|
| | 1 °F. | 2 °F. | 3 °F. | 4 °F. |
| 300 | 250 | 325 | 560 | 614 |

TABLE 12

| Heating time | Column | |
|---|---|---|
| | 1 °F. | 2 °F. |
| 0 sec. | 69 | 71 |
| 30 | 217 | 227 |
| 60 | 227 | 252 |
| 90 | 284 | 481 |
| 120 | 285 | 807 |
| 150 | 388 | *1 |
| 180 | 490 | |
| 210 | 518 | |
| 240 | 520 | |
| 270 | 520 | |
| 300 | 518 | |

*1 807° F. at 120 seconds, discontinued run.

EXAMPLE 11

Figure 15:
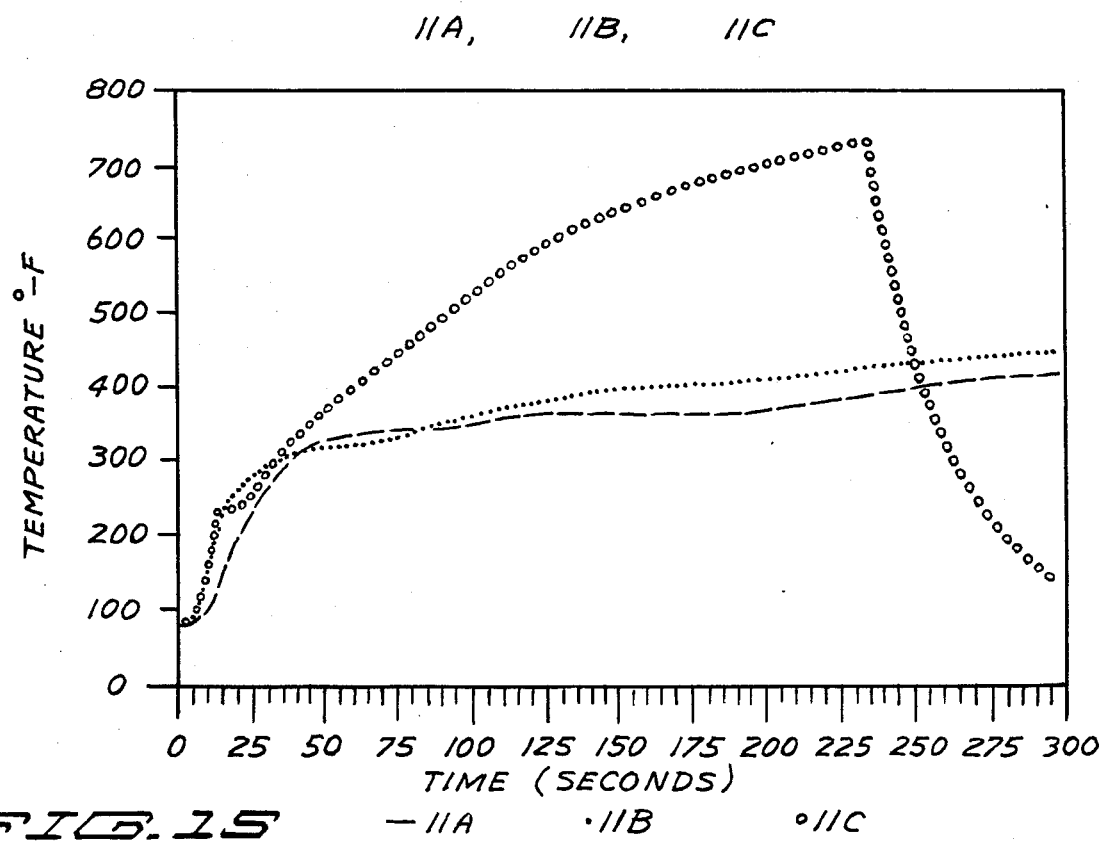

15 g of ground exfoliated vermiculite were dispersed into 125 ml of a 0.36M HCl solution containing 7.5 g of sodium chloride M.W. 58.44 and 5 g of dispersed Fiber Frax ®, a ceramic refractory fiber (vitreous aluminosilicate fiber) Sohio Carborundum Co., Niagara Falls, N.Y. To the above prepared solution 50 g of alumina monohydrate (Boehmite M.W. 59.987) was added and dispersed with vigorous stirring. A semitransparent gel immediately formed and was allowed to equilibrate for one hour. The prepared gel was spread into 5.5 inch×7.5 inch×0.100 inch thick sheets containing a nonwoven fiberglass mat (ELK Corporation, Ennis, Tex.) for internal structural support and dried for several hours at 165° F. (74° C.). The structure exhibited little or no shrinkage, warpage or cracking. The final thickness was 0.050-0.055 inch, weight 39.1 g. The structure was measured for heating performance in a microwave field as previously described. The recorded and averaged temperature profile of the heating structure is shown in FIG. 15 as line 11A.

25 g of ground exfoliated vermiculite were dispersed into 125 ml of a 0.36M HCl solution containing 7.5 g of sodium chloride M.W. 58.44 and 5 g of dispersed Fiber Frax ®, a ceramic refractory fiber. To the above prepared solution 50 g of alumina monohydrate (Boehmite M.W. 59.987) was added and dispersed with vigorous stirring. A semitransparent gel immediately formed and was allowed to equilibrate for one hour. The prepared gel was spread into 5.5 inch×7.375 inch×0.100 inch thick sheets containing a nonwoven fiberglass mat for internal structural support and dried for several hours at 165° F. (74° C.). The structure exhibited little or no shrinkage, warpage or cracking. The final thickness was 0.050-0.055 inch, weight 36.7 g. The structure was measured for heating performance in a microwave field as previously described. The recorded and averaged temperature profile of the heating structure is shown in FIG. 15 as line 11B.

The prepared susceptor described in the first paragraph of this example was ground to a powder, the reinforcing media removed and pressed into a disc 75 mm diameter (3.0 inches), thickness 0.115 inch, weight 22.2 g. The heating properties of the densified structure is shown in FIG. 15 as line 11C. Similar heating increases are observed in structures 0.040 inch thick with a density of 2.0 g cm$^{-3}$ and surface dimensions of 5.5 inches×7.5 inches.

Industrial Applicability

This invention has particular utility in the packaging of food for distribution and sale in refrigerated and frozen display cases as well as subsequent uses by the consumer in the microwave heating or cooking of the food item packaged therein, especially foods that are prone to becoming soggy during microwave heating and which require browning or crisping of a surface.

What is claimed is:

1. A package article for food to be heated by microwave energy in a microwave oven comprising:
    a tray fabricated form dielectric material for holding a food item having a top and bottom surface,
    a substantially planar microwave heating susceptor disposed within said tray, said microwave heating susceptor fabricated from a ceramic composition, comprising:
    (a) a first ceramic gel susceptor material, said ceramic gel susceptor material having about 17% to 35% by weight of the gel of bound water (wet basis);
    (b) a ceramic binder in amounts sufficient to bind the ceramic gel susceptor material;
    (c) about 0.01% to about 12% by weight of the composition of common salt, wherein the ceramic composition is unvitrified, and wherein the susceptor is in intimate physical contact with the food item and ranges in thickness from about 0.3 to 8 mm.

2. The article of claim 1 wherein the binder comprises about 0.1% to 98% by weight of the composition and wherein the ceramic gel susceptor material comprises about 2% to 99.8% of the composition and wherein the ceramic gel is selected from the group consisting of alumina gels, silica gels, chromia gels, thoria gels, mullite gels, mixed oxide gels and mixtures thereof.

3. The composition of claim 2 wherein the ceramic composition comprises 0.1% to 10% of salt, wherein the ceramic gel susceptor material includes about 0.1% to 10% by weight of the gel of unbound water and wherein the salt is dispersed within the ceramic material.

4. The article of claim 3 wherein the ceramic gel is a xerogel, and wherein the ceramic composition comprises about 1% to 6% salt, and additionally comprises:
    (d) about 0.01% to 50% by weight of the ceramic composition of a second, non-gel ceramic susceptor material which absorbs microwave energy.

5. The article of claim 4 wherein the binder is selected from the group consisting of calcium sulphate, cements, calcite, silica fiber, whether amorphorus or crystalline, dolomite, aragonite, feldspar, pulverized polyamide fibers, colloidal silicas, fumed silicas, fiberglass, wood pulp, cotton fibers, thermoplastic resins and thermosetting resins.

6. The article of claim 5 additionally comprising:
    a sleeve fabricated from a dielectric material having a top major surface, a bottom major surface spaced apart and parallel to the top surface, a pair of spaced, parallel walls and a pair of spaced, opposite side openings and wherein disposed within which sleeve is the tray.

7. The article of claim 6 wherein the tray comprises a tray bottom wall and a side wall, and wherein the susceptor conforms to the shape of the tray bottom wall and is disposed above the tray bottom wall.

8. The article of claim 7 wherein the ceramic gel susceptor material is an acidic xerogel.

9. The article of claim 8 additionally comprising a second microwave heating susceptor disposed within the tray spaced apart and parallel to the first susceptor, said second susceptor overlaying the food item and in physical contact therewith.

10. The article of claim 7 or 8 wherein the tray is circular.

11. The article of claim 7 or 8 wherein the tray includes a plurality of side walls at least two of which are parallel and of equal size and wherein the first and second susceptors are compositionally similar.

12. A package article for food to be heated in a microwave oven, comprising:
    a microwave heating susceptor in the form of a tray for holding a food item; wherein the susceptor is capable of heating in a microwave oven, and wherein said susceptor is fabricated from a ceramic composition, comprising:
    (a) a ceramic gel susceptor material which absorbs microwave energy, said ceramic gel material having about 17% to 35% by weight of the gel of bound water (wet basis) energy, and
    (b) a ceramic binder in amounts sufficient to bind the ceramic composition;
    (c) about 0.001% to 12% by weight of the composition of common salt; and wherein the compound is unvitrified.

13. The article of claim 12 wherein the binder comprises about 0.1% to 98% by weight of the composition and wherein the ceramic susceptor material comprises about 2% to 99.8% of the composition.

14. The composition of claim 13 wherein the ceramic composition comprises 0.1% to 10% of salt wherein the salt is dispersed within the ceramic gel susceptor material, and wherein the ceramic gel susceptor material includes about 1% to 5% by weight of the gel (wet basis) of free water.

15. The article of claim 14 wherein the ceramic susceptor material is selected from the group consisting of sodium metasilicate, talc, kaolin, calcined alumina, alumina or activated alumina, clay, aluminosilicates, sodium aluminosilicates and mixtures thereof.

16. The article of claim 15 wherein the binder is selected from the group consisting of calcium sulphate, cements, dolomite, calcite, silica fiber, whether amorphorus or crystalline, aragonite, feldspar, pulverized polyamide fiber, colloidal silicas, fumed silicas, fiberglass, wood pulp, cotton fibers, thermoplastic resins and thermosetting resins.

17. The article of claim 16 wherein the tray comprises a tray bottom wall and a side wall each of which range from about 3 to 12 mm in thickness, 18. The article of claim 17 additionally comprising a lid shaped to cover the tray fabricated from the ceramic composition.

19. The article of claim 18 additionally comprising:
    a sleeve fabricated from a dielectric material having a top major surface, a bottom major surface spaced apart and parallel to the top surface, a pair of spaced, parallel walls and a pair of spaced, opposite side openings and wherein disposed within which sleeve is the tray.

20. The article of claim 17, 18 or 19 additionally comprising a food item disposed within the tray.

* * * * *

UNITED STATES PATENT AND TRADEMARK OFFICE
CERTIFICATE OF CORRECTION

PATENT NO. : 4,806,718
DATED : Feb. 21, 1989
INVENTOR(S) : Jonathan Seaborne and James R. Borek It is certified that error appears in the above-identified patent and that said Letters Patent is hereby corrected as shown below:

Col. 7, line 67 - "lie a ball" should be -- like a ball --.

Col. 12, line 32 - "plaar" should be -- planar --.

Col. 14, line 48 - "7.59 of" should be -- 7.5g --.

Col. 14, line 56 - "line the" should be -- line 2. The --. (The should begin a new paragraph)

Col. 15, line 16 - "Example" should be -- Example 3 --.

Col. 15, line 21 - "8.44" should be -- 58.44 --.

Col. 15, line 65 - "amorphous" should be -- amorphorus --.

Col. 16, line 54 - "5 ml" should be -- 125 ml --.

Col. 19, line 11 - "A1)." should be -- A10. --.

Col. 21, line 56 - "stock used" should be -- stock solutions used --.

Col. 21, line 68 - "over" should be -- oven --.

Signed and Sealed this

Twelfth Day of December, 1989

Attest:

JEFFREY M. SAMUELS

*Attesting Officer*         *Acting Commissioner of Patents and Trademarks*